US012567207B2

(12) United States Patent
Meng et al.

(10) Patent No.: US 12,567,207 B2
(45) Date of Patent: Mar. 3, 2026

(54) THREE-DIMENSIONAL MODELING AND RECONSTRUCTION OF CLOTHING

(71) Applicant: Tencent America LLC, Palo Alto, CA (US)

(72) Inventors: Xiaoxu Meng, Palo Alto, CA (US); Weiyang Li, Palo Alto, CA (US); Bo Yang, Palo Alto, CA (US)

(73) Assignee: Tencent America LLC, Palo Alto, CA (US)

( * ) Notice: Subject to any disclaimer, the term of this patent is extended or adjusted under 35 U.S.C. 154(b) by 289 days.

(21) Appl. No.: 18/142,463

(22) Filed: May 2, 2023

(65) Prior Publication Data

US 2024/0371095 A1     Nov. 7, 2024

(51) Int. Cl.
G06T 17/20 (2006.01)
G06T 19/20 (2011.01)

(52) U.S. Cl.
CPC .............. G06T 17/20 (2013.01); G06T 19/20 (2013.01); *G06T 2210/16* (2013.01); *G06T 2219/2016* (2013.01)

(58) Field of Classification Search
None
See application file for complete search history.

(56) References Cited

U.S. PATENT DOCUMENTS 10,813,715 B1 * 10/2020 Chojnowski .......... G06F 3/0304
11,062,508 B1 * 7/2021 Moody ................... G06F 18/22

2016/0379419 A1 * 12/2016 Khalili .................... G06T 19/20
                                                              345/419
2023/0046431 A1 * 2/2023 Garg ....................... G06T 15/04
2023/0252747 A1 * 8/2023 Meador .................... G06T 7/60
                                                              345/419
2024/0029353 A1 * 1/2024 Wang ...................... G06T 17/20

(Continued)

OTHER PUBLICATIONS

Shahram Izadi, David Kim, Otmar Hilliges, David Molyneaux, Richard Newcombe, Pushmeet Kohli, Jamie Shotton, Steve Hodges, Dustin Freeman, Andrew Davison, and Andrew Fitzgibbon. 2011. KinectFusion: real-time 3D reconstruction and interaction using a moving depth camera. In Proceedings of the 24th annual ACM symposium on User interface software and technology (UIST'11). Association for Computing Machinery, New York, NY, USA, 559-568.

(Continued)

*Primary Examiner* — Andrew G Yang
(74) *Attorney, Agent, or Firm* — ArentFox Schiff LLP

(57) ABSTRACT

A clothing template is determined from a previously constructed clothing model, associated with a piece of clothing in a plurality of 2D images, and indicates a 3D mesh that includes a plurality of full loops. A plurality of side silhouettes of the piece of clothing is determined based on the plurality of 2D images. A plurality of key point sets is determined based on the plurality of full loops of the clothing template and the plurality of side silhouettes. Each of the plurality of key point sets is determined based on a corresponding one of the plurality of full loops. A plurality of vertices and a plurality of edge loops of the 3D clothing model are determined based on the plurality of key point sets and a plurality of clothing parameters. A plurality of faces of the 3D clothing model is determined based on the determined plurality of vertices.

20 Claims, 21 Drawing Sheets

(56) References Cited

U.S. PATENT DOCUMENTS

2024/0144501 A1* 5/2024 Grona ..................... G06T 15/06

OTHER PUBLICATIONS

A. Geiger, J. Ziegler and C. Stiller, "StereoScan: Dense 3d reconstruction in real-time," 2011 IEEE Intelligent Vehicles Symposium (IV), 2011, pp. 963-968.

Alldieck T, Magnor M, Bhatnagar B L, et al. Learning to reconstruct people in clothing from a single RGB camera. In Proceedings of the IEEE/CVF Conference on Computer Vision and Pattern Recognition. 2019: 1175-1186.

Ma Q, Yang J, Ranjan A, et al. Learning to dress 3d people in generative clothing[C]//Proceedings of the IEEE/CVF Conference on Computer Vision and Pattern Recognition. 2020: 6469-6478.

Loper M, Mahmood N, Romero J, et al. SMPL: A skinned multi-person linear model[J]. ACM transactions on graphics (TOG), 2015, 34(6): 1-16.

Saito S, Huang Z, Natsume R, et al. Pifu: Pixel-aligned implicit function for high-resolution clothed human digitization. Proceedings of the IEEE/CVF international conference on computer vision. 2019: 2304-2314.

Saito S, Simon T, Saragih J, et al. Pifuhd: Multi-level pixel-aligned implicit function for high-resolution 3d human digitization, Proceedings of the IEEE/CVF Conference on Computer Vision and Pattern Recognition. 2020: 84-93.

Bhatnagar B L, Tiwari G, Theobalt C, et al. Multi-garment net: Learning to dress 3d people from images. Proceedings of the IEEE/CVF international conference on computer vision. 2019: 5420-5430.

Zhu H, Cao Y, Jin H, et al. Deep fashion3d: A dataset and benchmark for 3d garment reconstruction from single images. Computer Vision-ECCV 2020: 16th European Conference, Glasgow, UK, Aug. 23-28, 2020, Proceedings, Part I 16. Springer International Publishing, 2020: 512-530.

Corona E, Pumarola A, Alenya G, et al. Smplicit: Topology-aware generative model for clothed people. Proceedings of the IEEE/CVF conference on computer vision and pattern recognition. 2021: 11875-11885.

Mescheder L, Oechsle M, Niemeyer M, et al. Occupancy networks: Learning 3d reconstruction in function space. Proceedings of the IEEE/CVF conference on computer vision and pattern recognition. 2019: 4460-4470.

* cited by examiner

Figure 1:
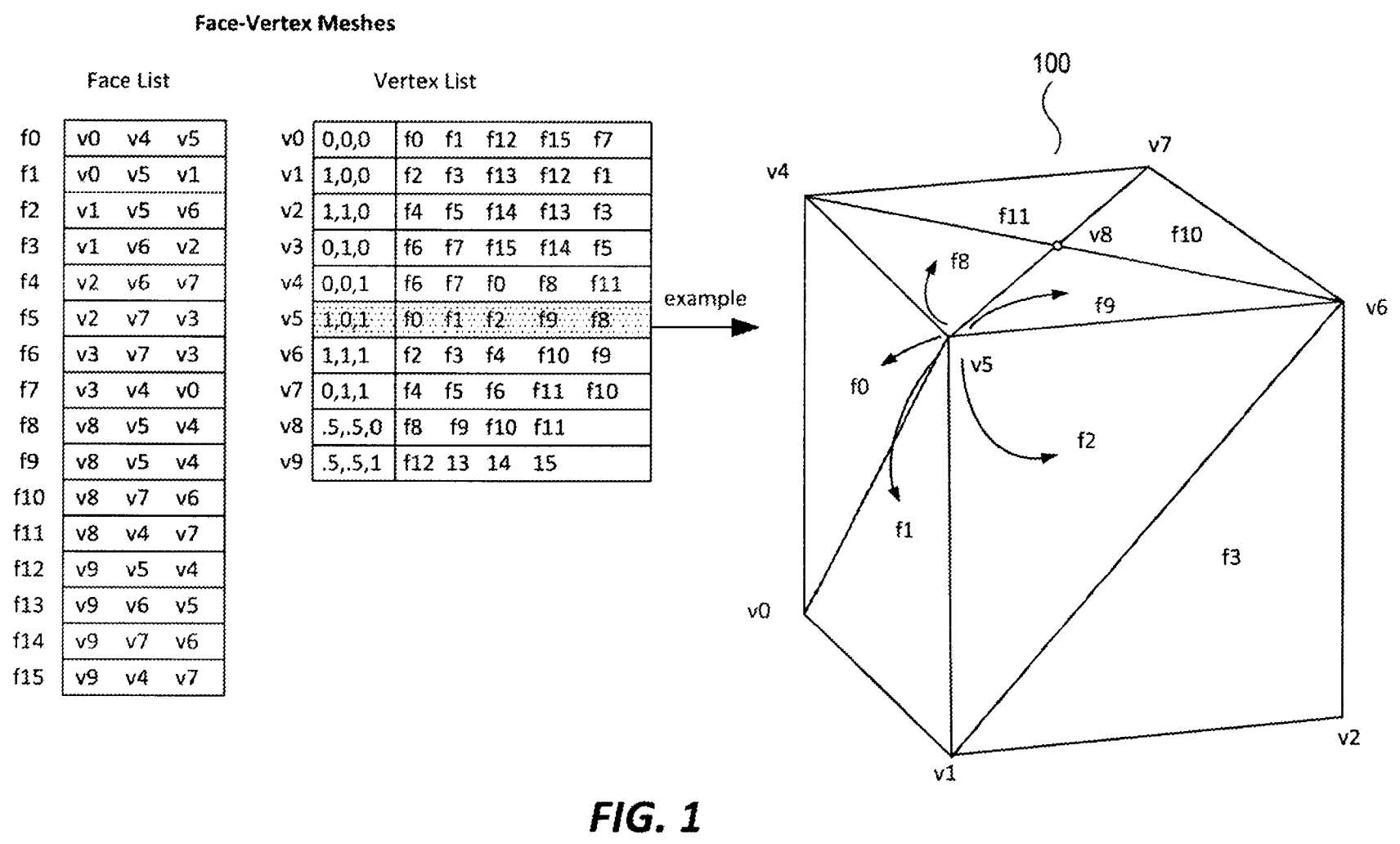

Face-Vertex Meshes

Face List

| | | | |
|---|---|---|---|
| f0 | v0 | v4 | v5 |
| f1 | v0 | v5 | v1 |
| f2 | v1 | v5 | v6 |
| f3 | v1 | v6 | v2 |
| f4 | v2 | v6 | v7 |
| f5 | v2 | v7 | v3 |
| f6 | v3 | v7 | v3 |
| f7 | v3 | v4 | v0 |
| f8 | v8 | v5 | v4 |
| f9 | v8 | v5 | v4 |
| f10 | v8 | v7 | v6 |
| f11 | v8 | v4 | v7 |
| f12 | v9 | v5 | v4 |
| f13 | v9 | v6 | v5 |
| f14 | v9 | v7 | v6 |
| f15 | v9 | v4 | v7 |

Vertex List

| | | | | | | |
|---|---|---|---|---|---|---|
| v0 | 0,0,0 | f0 | f1 | f12 | f15 | f7 |
| v1 | 1,0,0 | f2 | f3 | f13 | f12 | f1 |
| v2 | 1,1,0 | f4 | f5 | f14 | f13 | f3 |
| v3 | 0,1,0 | f6 | f7 | f15 | f14 | f5 |
| v4 | 0,0,1 | f6 | f7 | f0 | f8 | f11 |
| v5 | 1,0,1 | f0 | f1 | f2 | f9 | f8 |
| v6 | 1,1,1 | f2 | f3 | f4 | f10 | f9 |
| v7 | 0,1,1 | f4 | f5 | f6 | f11 | f10 |
| v8 | .5,.5,0 | f8 | f9 | f10 | f11 | |
| v9 | .5,.5,1 | f12 | 13 | 14 | 15 | | example

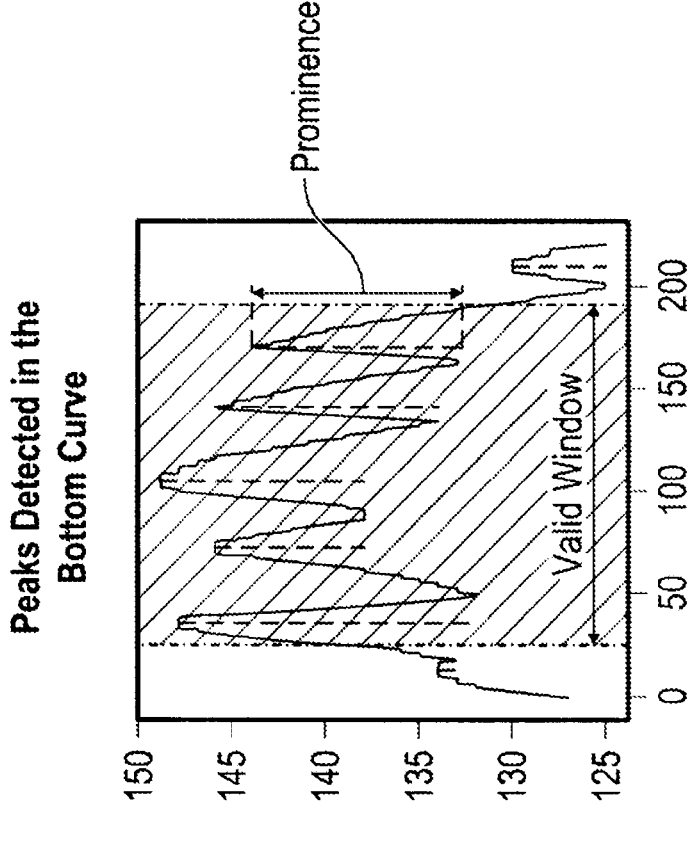
Peaks Detected in the Bottom Curve
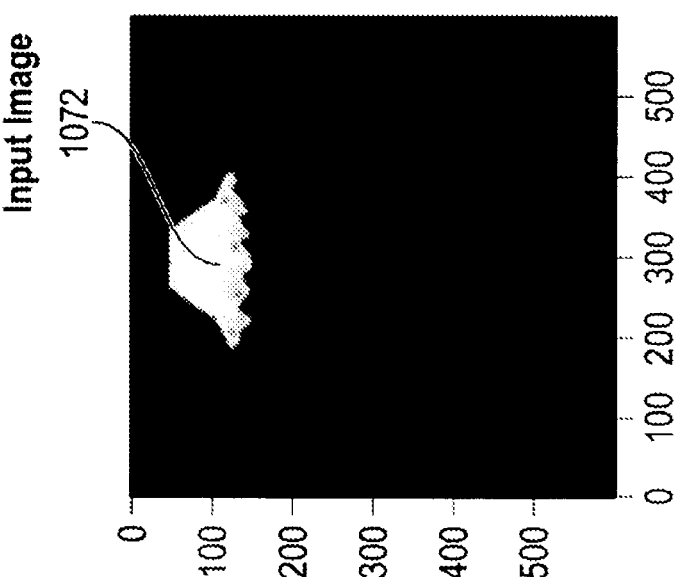
Input Image
*FIG. 17*

Single V Type

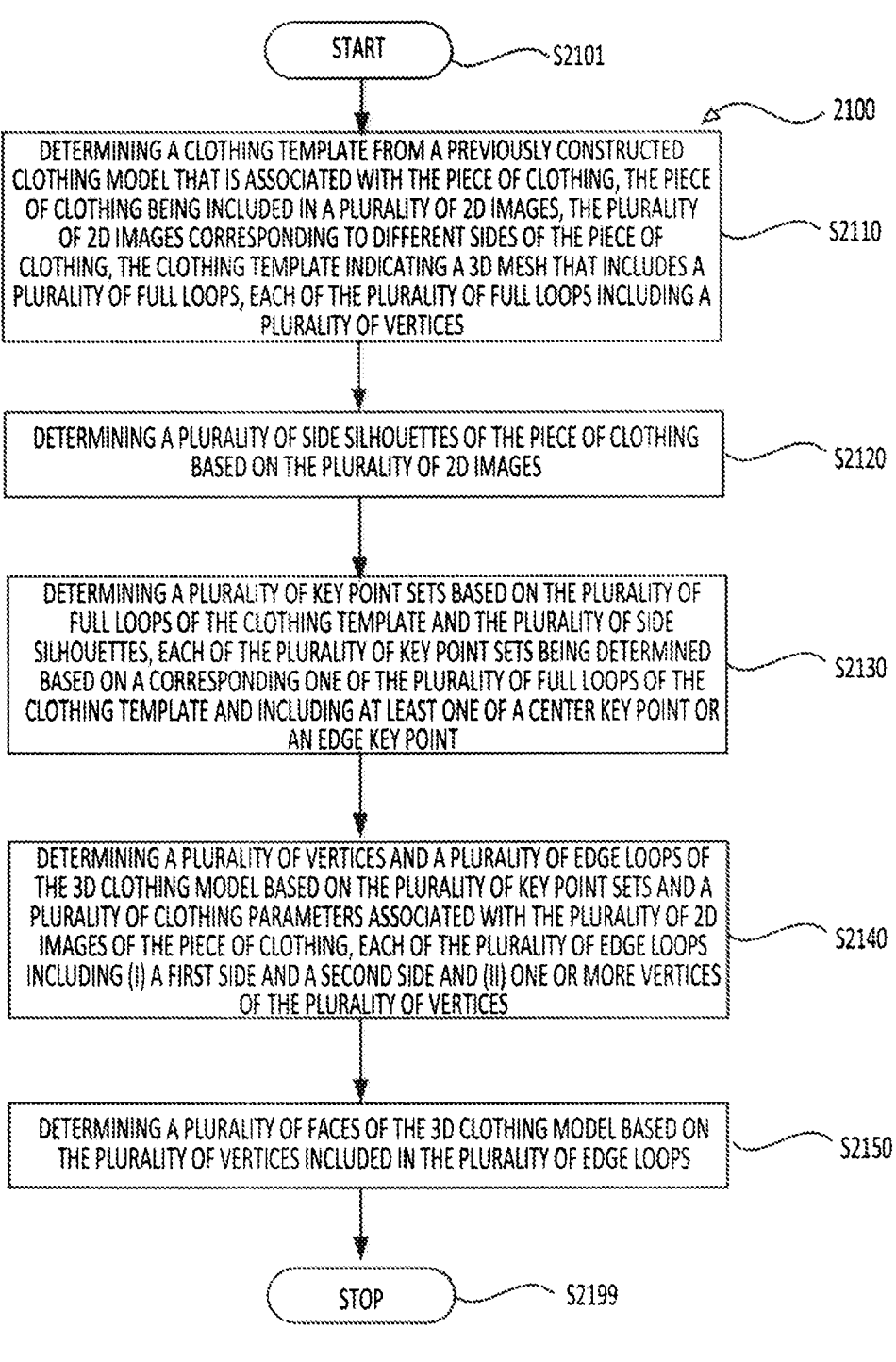

START — S2101

2100

DETERMINING A CLOTHING TEMPLATE FROM A PREVIOUSLY CONSTRUCTED CLOTHING MODEL THAT IS ASSOCIATED WITH THE PIECE OF CLOTHING, THE PIECE OF CLOTHING BEING INCLUDED IN A PLURALITY OF 2D IMAGES, THE PLURALITY OF 2D IMAGES CORRESPONDING TO DIFFERENT SIDES OF THE PIECE OF CLOTHING, THE CLOTHING TEMPLATE INDICATING A 3D MESH THAT INCLUDES A PLURALITY OF FULL LOOPS, EACH OF THE PLURALITY OF FULL LOOPS INCLUDING A PLURALITY OF VERTICES — S2110

DETERMINING A PLURALITY OF SIDE SILHOUETTES OF THE PIECE OF CLOTHING BASED ON THE PLURALITY OF 2D IMAGES — S2120

DETERMINING A PLURALITY OF KEY POINT SETS BASED ON THE PLURALITY OF FULL LOOPS OF THE CLOTHING TEMPLATE AND THE PLURALITY OF SIDE SILHOUETTES, EACH OF THE PLURALITY OF KEY POINT SETS BEING DETERMINED BASED ON A CORRESPONDING ONE OF THE PLURALITY OF FULL LOOPS OF THE CLOTHING TEMPLATE AND INCLUDING AT LEAST ONE OF A CENTER KEY POINT OR AN EDGE KEY POINT — S2130

DETERMINING A PLURALITY OF VERTICES AND A PLURALITY OF EDGE LOOPS OF THE 3D CLOTHING MODEL BASED ON THE PLURALITY OF KEY POINT SETS AND A PLURALITY OF CLOTHING PARAMETERS ASSOCIATED WITH THE PLURALITY OF 2D IMAGES OF THE PIECE OF CLOTHING, EACH OF THE PLURALITY OF EDGE LOOPS INCLUDING (I) A FIRST SIDE AND A SECOND SIDE AND (II) ONE OR MORE VERTICES OF THE PLURALITY OF VERTICES — S2140

DETERMINING A PLURALITY OF FACES OF THE 3D CLOTHING MODEL BASED ON THE PLURALITY OF VERTICES INCLUDED IN THE PLURALITY OF EDGE LOOPS — S2150

STOP — S2199

*FIG. 21*

THREE-DIMENSIONAL MODELING AND RECONSTRUCTION OF CLOTHING

TECHNICAL FIELD

The present disclosure describes embodiments generally related to computing methodologies, including three-dimensional (3D) modeling and reconstruction of clothing.

BACKGROUND

The background description provided herein is for the purpose of generally presenting the context of the disclosure. Work of the presently named inventor, to the extent the work is described in this background section, as well as aspects of the description that may not otherwise qualify as prior art at the time of filing, are neither expressly nor impliedly admitted as prior art against the present disclosure.

Three-dimensional (3D) modeling and reconstruction is a fundamental problem in game development. Reconstruction of 3D clothes can be challenging because clothes may have a variety of styles and materials. Related 3D modeling algorithms are able to reconstruct high-fidelity clothes from multi-view images. However, the reconstruction quality heavily relies on the quality of the training data. Moreover, due to constraints imposed by a skinned multi-person linear model (SMPL) human template and limitations of neural networks, these approaches can be plagued by insufficient precision and irregular topologies, which prevent the methods from being applied to industrial-level applications.

SUMMARY

Aspects of the disclosure include methods, apparatuses, and non-transitory computer-readable storage mediums for computing methodologies. In some examples, an apparatus for generating a three-dimensional (3D) skirt model of a skirt includes processing circuitry.

According to an aspect of the disclosure, a method of generating a 3D clothing model of a piece of clothing is provided. In the method, a clothing template is determined from a previously constructed clothing model and associated with the piece of clothing. The piece of clothing is included in a plurality of 2D images. The plurality of 2D images corresponds to different sides of the piece of clothing. The clothing template indicates a 3D mesh that includes a plurality of full loops, where each of the plurality of full loops includes a plurality of vertices. A plurality of side silhouettes of the piece of clothing is determined based on the plurality of 2D images. A plurality of key point sets is determined based on the plurality of full loops of the clothing template and the plurality of side silhouettes. Each of the plurality of key point sets is determined based on a corresponding one of the plurality of full loops of the clothing template and includes at least one of a center key point or an edge key point. A plurality of vertices and a plurality of edge loops of the 3D clothing model are determined based on the plurality of key point sets and a plurality of clothing parameters associated with the plurality of 2D images of the piece of clothing. Each of the plurality of edge loops includes (i) a first side and a second side and (ii) one or more vertices of the plurality of vertices. A plurality of faces of the 3D clothing model is determined based on the plurality of vertices included in the plurality of edge loops.

In some embodiments, the 3D clothing model is generated based on the determined plurality of vertices and the determined plurality of faces. In an example, the 3D clothing model is generated by assembling the determined plurality of vertices and the determined plurality of faces.

In an example, to determine the clothing template, a body silhouette of a body associated with the plurality of 2D images of the piece of clothing is determined. To determine the body silhouette, a 3D model of the body is determined based on one or more of the plurality of 2D images. A plurality of height values associated with a lower portion of the body in the 3D model is determined. Each of the plurality of height values indicates a respective height along the lower portion of the body. A vertex set for each of the plurality of height values is determined. Each of the vertex sets includes a plurality of vertices within a range corresponding to one of the plurality of height values. A plurality of bounding loops of the body silhouette of the body is determined. Each of the plurality of bounding loops includes a respective one of the vertex sets.

In an example, to determine the clothing template, the vertices included in the plurality of full loops are extracted from a foreground layer of the piece of clothing in the plurality of 2D images. The vertices included in the plurality of full loops are sorted from a top side of the plurality of full loops to a bottom side of the plurality of full loops. The plurality of vertices in each of the plurality of full loops are also sorted, such as in a clockwise direction. Faces are generated based on the sorted vertices of the plurality of full loops. The plurality of full loops is extended by adding vertices to the top side and the bottom side of the plurality of full loops. A distance between two respective full loops of the plurality of full loops is adjusted. Vertices and faces of a plurality of half loops are extracted. The plurality of half loops is associated with the body silhouette of the body included in the plurality of 2D images. The clothing template is determined based on (i) the vertices and the faces of the plurality of full loops and (ii) the vertices and the faces of the plurality of half loops.

In some embodiments, to determine the plurality of side silhouettes of the piece of clothing, a left silhouette is determined based on a left boundary of the piece of clothing in a front-view image of the plurality of 2D images. A front silhouette is determined based on a front boundary of the piece of clothing in a side-view image of the plurality of 2D images. A back silhouette is determined based on a back boundary of the piece of clothing in the side-view image of the plurality of 2D images.

In an example, to determine the plurality of key point sets, based on a center of each of the plurality of full loops of the clothing template being included in at least one of the front-view image of the plurality of 2D images or the side-view image of the plurality of 2D images, an uppermost full loop of the plurality of full loops of the clothing template is aligned with a top side of the piece of clothing and a lowermost full loop of the plurality of full loops of the clothing template is aligned with a bottom side of the piece of clothing. A center key point, a left key point, a front key point, and a back key point of each of the plurality of full loops of the clothing template are determined as the key points included in the plurality of key point sets.

In an example, to determine the plurality of vertices, the plurality of edge loops of the 3D clothing model is determined based on the plurality of key point sets. Each of the plurality of edge loops is determined based on a respective one of the plurality of key point sets. Accordingly, a center of each of the plurality of edge loops is a center key point of the respective one of the plurality of key point sets. A diameter in a major axis of each of the plurality of edge loops is a difference between the center key point and the left key point of the respective one of the plurality of key point sets. A first distance in a minor axis of each of the plurality of edge loops is a difference between the center key point and the front key point of the respective one of the plurality of key point sets. A second distance in the minor axis of each of the plurality of edge loops is a difference between the center key point and the back key point of the respective one of the plurality of key point sets.

In an example, to determine the plurality of vertices, based on the plurality of clothing parameters indicating that the piece of clothing is a first skirt type (e.g., a smooth-shaped skirt), $M_s/2$ vertex groups are determined on the first side (e.g., front side) of each of the plurality of edge loops, where each of the $M_s/2$ vertex groups on the first side includes a respective vertex. $M_s/2$ vertex groups are determined on the second side (e.g., back side) of the corresponding one of the plurality of edge loops, where each of the $M_s/2$ vertex groups on the second side includes a respective vertex, $M_s$ being a predefined group number.

In an example, to determine the plurality of vertices, based on the plurality of clothing parameters indicating that the piece of clothing is a second skirt type (e.g., a Z-shaped skirt), $M_z/2$ vertex groups are determined on the first side of each of the plurality of edge loops and $M_z/2$ vertex groups are determined on the second side of the corresponding one of the plurality of edge loops. $M_z$ indicates a predefined number of wrinkles associated with the piece of clothing. Two vertices in each of the $M_z/2$ vertex groups are determined in a first edge loop of the plurality of edge loops, where the two vertices include a vertex in a wrinkle region and another vertex in a non-wrinkle region of the piece of clothing. Three vertices are determined in each of the $M_z/2$ vertex groups in an edge loop other than the first edge loop of the plurality of edge loops, where the three vertices include a first vertex and a second vertex in the wrinkle region and a third vertex in the non-wrinkle region of the piece of clothing.

In an example, to determine the plurality of vertices, based on the plurality of clothing parameters indicating that the piece of clothing is a third skirt type (e.g., a wave-shaped skirt), $M_w/2$ vertex groups are determined on the first side of each of the plurality of edge loops and $M_w/2$ vertex groups are determined on the second side of the corresponding one of the plurality of edge loops, where $M_w$ indicates a predefined number of wrinkles associated with the piece of clothing. Two vertices are determined in each of the $M_w/2$ vertex groups in a first edge loop of the plurality of edge loops. The two vertices include a first vertex in a wrinkle region and a second vertex in a non-wrinkle region of the piece of clothing. Four vertices are determined in each of the $M_w/2$ vertex groups in a second edge loop of the plurality of edge loops in response to a transition between the first edge loop and the second edge loop being less than a transition threshold. The four vertices include three vertices in the wrinkle region and a vertex in the non-wrinkle region of the piece of clothing. Eight vertices are determined in each of the $M_w/2$ vertex groups in the second edge loop of the plurality of edge loops in response to a transition between the first edge loop and the second edge loop being greater than or equal to the transition threshold. The eight vertices include seven vertices in the wrinkle region and the vertex in the non-wrinkle region of the piece of clothing. Eight vertices are determined in each of the $M_w/2$ vertex groups in an edge loop other than the first and second edge loops of the plurality of edge loops, where the eight vertices include seven vertices in the wrinkle region and a vertex in the non-wrinkle region of the piece of clothing.

To determine the plurality of faces of the 3D clothing model, in an example, based on the plurality of clothing parameters indicating that the piece of clothing is a first skirt type, such as a smooth-shaped skirt, the plurality of faces of the 3D clothing model is determined based on the faces associated with the clothing template. In an example, based on the plurality of clothing parameters indicating that the piece of clothing is one of a second skirt type (e.g., a Z-shaped skirt) and a third skirt type (e.g., a wave-shaped skirt), in response to a first edge loop and a second edge loop of the plurality of edge loops having a same number of vertices, (i) a first vertex of the first edge loop and a first vertex of the second edge loop, (ii) a second vertex of the first edge loop and a second vertex of the second edge loop, and (iii) the first vertex of the first edge loop and the second vertex of the second vertex are connected to form two respective faces. In response to the first edge loop and the second edge loop of the plurality of edge loops having a different number of vertices, (i) the first vertex of the first edge loop and the first vertex of the second edge loop, and (ii) the first vertex of the first edge loop and the second vertex of the second edge loop are connected based on a Euclidian distance between the first vertex of the first edge loop and the second vertex of the second edge loop being smaller than a Euclidian distance between the first vertex of the second edge loop and the second vertex of the first edge loop.

In some embodiments, the plurality of clothing parameters indicates at least one of a clothing type, a number of clothing corner points, a clothing wrinkle number, a clothing wrinkle size, a wrinkle type, or a clothing wrinkle area ratio.

In the method, the clothing type of the piece of clothing is determined. To determine the clothing type of the piece of clothing, a neural network is trained based on random clothing parameters, and the clothing type of the piece of clothing is determined based on the neural network.

In an example, to train the neural network, default values of feature parameters associated with a clothing type of a piece of clothing are determined. The feature parameters can include the number of clothing corner points, the clothing wrinkle number, the clothing wrinkle size, the wrinkle type, or the clothing wrinkle area ratio. The clothing type of the piece of clothing includes one of a smooth-shaped skirt, a Z-shaped skirt, and the wave-shaped skirt. Random values of the feature parameters are generated. Each of the random values is within a range of a default value of the default values corresponding to one of the feature parameters. A clothing mesh is reconstructed based on the generated random values of the feature parameters. Random textures are added to the clothing mesh, where the random textures indicate random geometric patterns. A front clothing view, a back clothing view, and a side clothing view of the piece of clothing are rendered based on the reconstructed clothing mesh with the added random textures.

In the method, the number of clothing corner points associated with the piece of clothing is determined. To determine the number of clothing corner points associated with the piece of clothing, one of the plurality of 2D images is binarized into a binary image in which a clothing region in the binary image is set as a foreground region. A convex hull is extracted from the binary image. The convex hull indicates a set of pixels in a convex polygon that surrounds the foreground region in the binary image. Smooth points are filtered out from the convex hull to retain non-smooth points. Each of the non-smooth points includes a curvature equal to or larger than a threshold. (i) a sum of a first coordinate value and a second coordinate value and (ii) a difference between the first coordinate value and the second coordinate value for each of the non-smooth points are determined. An upper right corner point is determined, which corresponds to a maximum value of the sums of the first coordinate values and the second coordinate values. An upper left corner is determined, which corresponds to a minimum value of the sums of the first coordinate values and the second coordinate values. A lower left corner point is determined, which corresponds to a maximum value of the differences between the first coordinate values and the second coordinate values, and a lower right corner point is determined, which corresponds to a minimum value of the differences between the first coordinate values and the second coordinate values.

In the method, the clothing wrinkle number associated with the piece of clothing is determined. To determine the clothing wrinkle number, based on the piece of clothing being a Z-shaped skirt, one of the plurality of 2D images is converted into gray scale. An edge map is extracted from the converted one of the plurality of 2D images. A plurality of straight line segments is determined in the extracted edge map based on a probabilistic Hough transformation. The clothing wrinkle number is determined based on a number of the determined plurality of straight line segments.

In the method, the clothing wrinkle number associated with the piece of clothing is determined. To determine the clothing wrinkle number, based on the piece of clothing being the wave-shaped skirt, one of the plurality of 2D images is binarized into a binary image in which a clothing region in the binary image is set as a foreground region. A clothing bottom curve of the piece of clothing is extracted from the binary image. A plurality of peaks in the clothing bottom curve is determined such that each of the plurality of peaks has a peak prominence greater than a first threshold and a distance of two adjacent peaks of the plurality of peaks is larger than a second threshold. The clothing wrinkle number is determined as a number of the determined plurality of peaks.

In the method, the clothing wrinkle size associated with the piece of clothing is determined. To determine the clothing wrinkle size, based on the piece of clothing being the wave-shaped skirt, one of the plurality of 2D images is binarized into a binary image. A bottom curve of the piece of clothing is extracted from the binary image. A plurality of peaks in the bottom curve is determined such that each of the plurality of peaks has a peak prominence greater than a first threshold, a distance of two adjacent peaks of the plurality of peaks is larger than a second threshold, and each of the plurality of peaks is located in a valid window in which a center part of the piece of clothing is included. A wrinkle width is determined as an average distance of distances between two adjacent peaks of the plurality of peaks and a wrinkle depth is determined as an average prominence of prominences of the plurality of peaks.

In the method, the wrinkle type is determined based on the piece of clothing being the wave-shaped skirt. To determine the wrinkle type, one of the plurality of 2D images is binarized into a binary image. A bottom curve of the piece of clothing is determined based on the binary image. Whether the wrinkle type is a double-Z type or a single-V type is determined based on a gradient of the bottom curve.

In the method, the clothing wrinkle area ratio associated with the piece of clothing is determined. To determine the clothing wrinkle area ratio, based on the piece of clothing being one of a Z-shaped skirt and the wave-shaped skirt, one of the plurality of 2D images is converted into gray scale. An edge map is extracted from the converted one of the plurality of 2D images. A plurality of straight line segments that corresponds to wrinkles of the piece of clothing is determined from the extracted edge map. The clothing wrinkle area ratio is determined based on a ratio between a maximum wrinkle height of the wrinkles and a height of the piece of clothing.

According to another aspect of the disclosure, an apparatus is provided. The apparatus has processing circuitry. The processing circuitry can be configured to perform any one or a combination of the methods for generating the 3D skirt model of the skirt.

Aspects of the disclosure also provide a non-transitory computer-readable medium storing instructions which when executed by at least one processor cause the at least one processor to perform any one or a combination of the methods for generating the 3D skirt model of the skirt.

BRIEF DESCRIPTION OF THE DRAWINGS

Further features, the nature, and various advantages of the disclosed subject matter will be more apparent from the following detailed description and the accompanying drawings in which:

FIG. 1 shows an example of a face-vertex mesh in accordance with some embodiments.

FIG. 17 is an exemplary illustration of an estimation of a wrinkle size for a wave skirt.

FIG. 21 shows a flow chart outlining an exemplary process to reconstruct a 3D skirt model of a skirt according to some embodiments of the disclosure.

DETAILED DESCRIPTION

Meshes, or face-vertex meshes, can represent an object as a set of faces and a set of vertices. As shown in FIG. 1, an object (100) can be represented by a plurality of vertices v0-v9, and a plurality of faces f0-f15. A face can include a plurality of vertices. For example, f0 can include vertices v0, v4, and v5. A vertex can be an intersection point of a plurality of faces. For example, a vertex v0 can be an intersection point of faces f0, f1, f12, f15, and f7. Face-vertex meshes are widely used as inputs to a modern graphics hardware. In the disclosure, a three-dimensional (3D) model of clothing can be reconstructed based on two-dimensional (2D) images of the clothing based on a parametric model, such as SmartSkirt. In exemplary embodiments, a skirt is used as an example. The skirt can be reconstructed based on 2D skirt images through SmartSkirt. The 2D skirt images may be computer-generated or manually drawn. The 3D models generated by SmartSkirt can be represented by face-vertex meshes.

Figure 2:
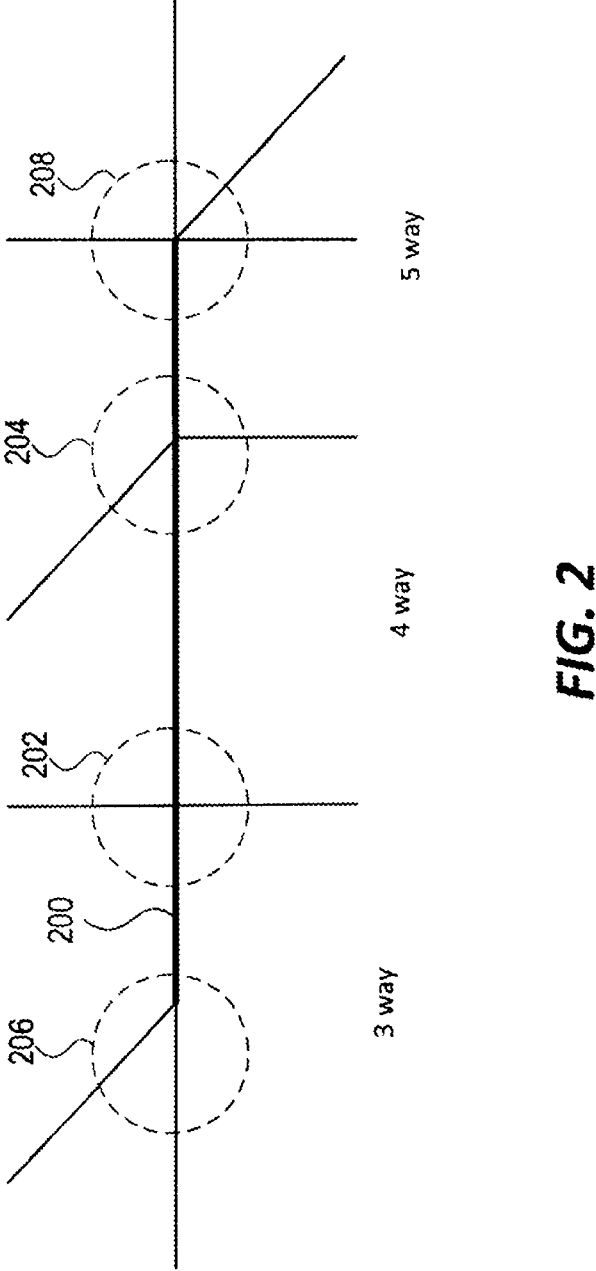
FIG. 2 is an illustration of an exemplary edge loop in accordance with some embodiments.

An edge loop can be defined as a set of edges where a loop follows a middle edge in every "four-way junction". The loop will end when it encounters another type of junction (e.g., a three-way junction or a five-way junction). FIG. 2 shows an exemplary edge loop (200) on a mesh surface. As shown in FIG. 2, the edge loop (200) extends through a first four-way junction (202) and a second four-way junction (204). The edge loop (200) connects a three-way junction (206) at a left side and a five-way junction (208) at a right side. An edge loop on a mesh surface can be a completed loop (or full loop) or a half loop (or incomplete loop). A half loop can indicate that the edge loop ends at another type of junction.

For a 3D mesh with given vertices, a routing is a formation of faces by connecting the vertices of the 3D mesh.

In the disclosure, a 3D model of a skirt can be generated based on a parametric model, for example based on Smart-Skirt, from one or more 2D images. The one or more 2D images can include cloth information and/or body information. The one or more 2D images can be manually created, computer generated, or captured by an electronic device (e.g., a camera or a video recorder). SmartSkirt can reconstruct high-fidelity 3D skirts with formatted triangulation. SmartSkirt can include a pre-processing stage and a reconstruction stage. In the pre-processing stage, a silhouette of a body (or body image) is determined by analyzing a 3D model (e.g., a 3D nude model) that is generated based on the one or more 2D images, and a template (or skirt template) can be extracted by analyzing an existing skirt (e.g., a previously generated skirt). In the reconstruction stage, a parameter prediction module can be applied to predict parameters associated with the skirt. The skirt reconstruction module (or skirt generation module) can receive the parameters as inputs, analyze the one or more 2D images, and generate a set of edge loops to represent the skirt illustrated in the one or more 2D images.

A task of deducing a 3D structure of cloth from a single image can be exceptionally difficult, primarily because of limited information available in the input and a vast search space involved. In related examples, clothing deformation has been studied from a skinned multi-person linear model (SMPL) body model from multi-view images, making clothing an additional term in SMPL. An end-to-end deep learning method can also be applied for digitizing highly detailed clothed humans that can infer both a 3D surface and a texture from a single image. However, the end-to-end deep learning method tends to take low-resolution images as an input to cover large spatial contexts and produce less precise 3D estimates due to memory limitations. The limitation of the end-to-end deep learning method can be addressed by formulating a multi-level architecture that is end-to-end trainable. The multi-level architecture includes a coarse level that observes a whole image at a lower resolution and a fine level that focuses on holistic reasoning and estimates a highly detailed geometry by observing higher-resolution images. However, early-stage approaches of the multi-level architecture are not able to retrieve separate meshes of clothing from images.

Multi-Garment Network (MGN) is layered on top of the SMPL and reconstructs clothed meshes from multiple frames (e.g., 1-8 frames) of a video. MGN leverages a digital wardrobe by registering a set of clothing templates to a dataset of real 3D scans of people in different clothing and poses. In an approach of MGN, given a small number of RGB frames (e.g., 8 frames), semantically segmented images (I) and 2D Joints (J) can be pre-computed. MGN can take {I, J} as an input and infer separable garments and a underlying human shape in a pose. Predictions can further be reposed using per-frame pose predictions. MGN can be trained with a combination of a 2D supervision and a 3D supervision. The 2D supervision can be used for an online refinement at test time.

Deep Fashion3D (DF3D) can infer a garment geometry from a single image. DF3D uses an adaptable template to enable learning of different types of clothing in a single network. DF3D starts with generating a template mesh $M_t$ which automatically adapts its topology to fit a target clothing category in an input image I. $M_t$ is then deformed to $M_p$ by fitting an estimated 3D pose. By treating feature lines as a graph, DF3D applies an image-guided graph convolutional network to capture 3D feature lines, which later triggers a handle-based deformation and generates a mesh $M_l$. To exploit the power of implicit representation, DF3D first employs OccNet (or Occupancy Networks) to generate a mesh model $M_l$ and then adaptively registers $M_l$ to $M_t$ by incorporating learned fine surface details from $M_l$ while discarding its outliers and noises caused by an enforcement of a close surface.

SMPLicit can also represent different garment topologies in a unified manner. A core aspect of SMPLicit includes an implicit function network C that predicts an unsigned distance from a query point p to a cloth iso-surface. An input $P_\beta$ is encoded from p given a body shape. During training, the network C is jointly trained, and a latent space representation is created. An image encoder f is included to take SMPL occlusion maps from ground truth garments and map the ground truth garments to shape representations $z_{cut}$. Further, a second component $z_{style}$ is trained as an auto-decoder. At an inference, the network C (·) is run for a densely sampled 3D space and Marching Cubes are used to generate a 3D garment mesh. Each cloth vertex can be posed using learnt skinning parameters of a closest SMPL vertex. A representation flexibility of SMPLicit builds upon an implicit model conditioned with the SMPL human body parameters and a learnable latent space that is semantically interpretable and aligned with the clothing attributes.

Nonetheless, due to constraints imposed by the SMPL human template and the limitations of neural networks, approaches such as MGN, DF3D, or SMPLicit can be affected by insufficient precision and irregular topologies, which makes them less suitable for certain applications, including industrial-level applications.

Embodiments of the present disclosure include the generation of a 3D skirt model of a skirt, for example based on SmartSkirt. A 3D skirt can be reconstructed using a formatted triangulation that can surpass related approaches in terms of regularity and fidelity.

A parametric model, such as SmartSkirt, can present a new framework to reconstruct a high-fidelity skirt mesh with a formatted triangulation efficiently from a plurality of view images. In an example, three-view images (e.g., a front-view image, a back-view image, and a side-view image) may be utilized. A main feature of the parametric model (or Smart-Skirt) includes generating a set of super-ellipse edge loops with dedicated jittering (e.g., adding vertices in the super-ellipse edge loops) to represent a target skirt. Thus, based on the parametric model (e.g., SmartSkirt), users are allowed to change the appearance of a skirt, such as a style, a pattern, and/or a routing of a skirt by tuning the parameters. Embodiments of the present disclosure can be used in generating clothes of 3D avatars, or objects, in game development or other virtual environments such as the metaverse, which can improve the efficiency of digital content creation.

Figure 3:
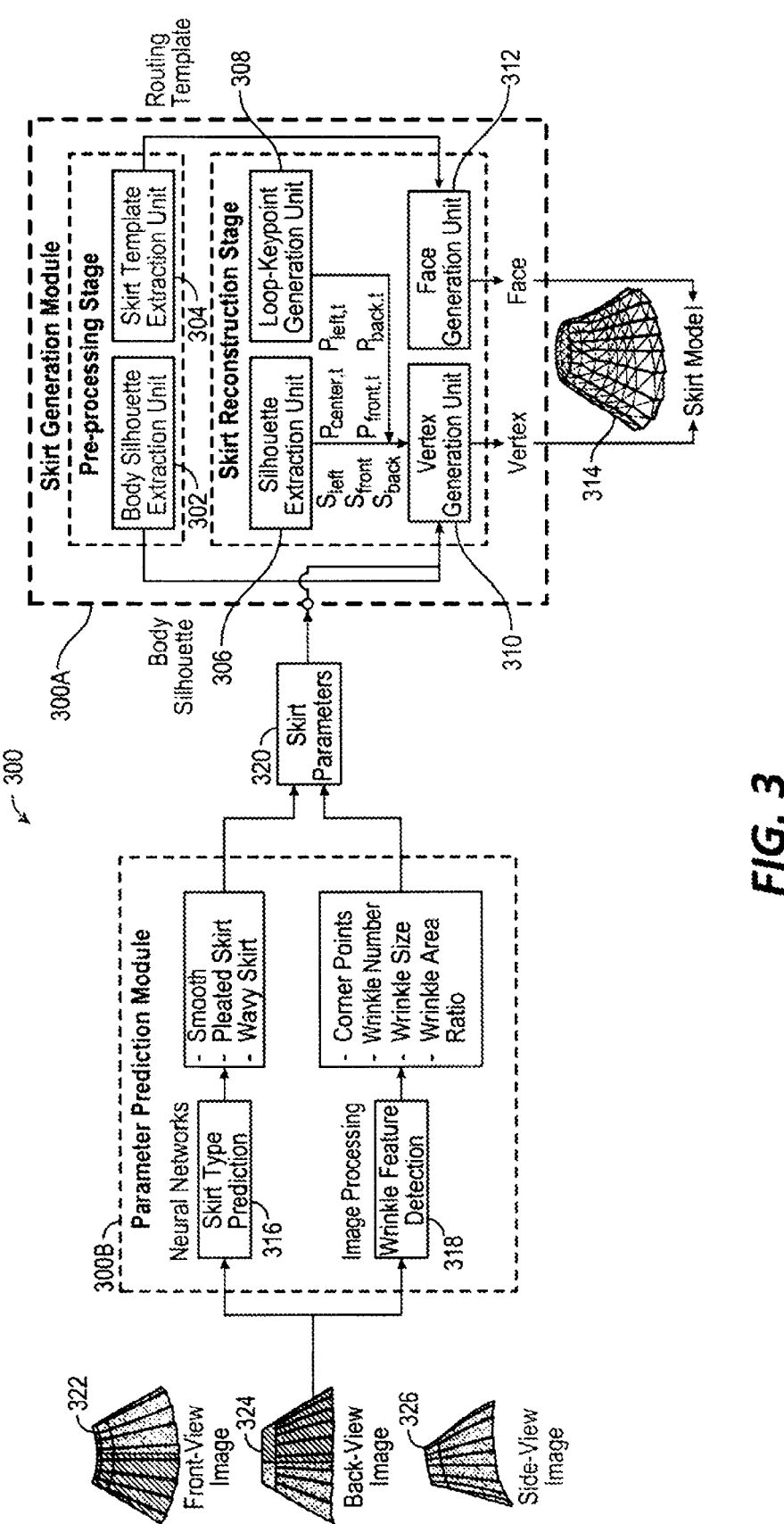
FIG. 3 is a schematic illustration of an exemplary pipeline for generating a three-dimensional (3D) skirt model of a skirt.

FIG. 3 shows an exemplary pipeline of a system (300) for reconstruction of a 3D skirt model of a skirt based on 2D images, such as through SmarkSkirt. As shown in FIG. 3, system (300) can include two modules: a skirt generation module (300A) and a parameter prediction module (300B). The skirt generation module (300A) can include a preprocessing stage and a skirt reconstruction stage. The preprocessing stage can include a body silhouette extraction unit (302) and a skirt template extraction unit (304). To reconstruct skirts that fit the 3D avatars and meet a style requirement, the preprocessing stage is provided to extract the body-silhouette and skirt template from input 2D images. The body silhouette extraction unit (302) can be configured to extract a body silhouette from a body image that is included in the 2D images. The skirt template extraction unit (304) can generate a skirt template based on the 2D images. The skirt reconstruction stage can include a skirt silhouette extraction unit (306) configured to generate side silhouettes of the skirt, a loop-keypoint generation unit (308) configured to determine key points (e.g., four corner key points) of the skirt, a vertex generation unit (310) configured to generate vertices of the 3D skirt model, and a face generation unit (312) configured to generate faces of the 3D skirt model. The parameter prediction module (300B) can include neural networks (316) configured to predict a type of the skirt and an image processing unit (318) configured to detect wrinkle features of the skirt.

Still referring to FIG. 3, a plurality 2D images of a skirt, such as a front-view image (322), a back-view image (324), and a side-view image (326) can be provided to the parameter prediction module. The neural network (316) can determine a type of the skirt. For example, the neural network (316) can determine whether the skirt is at least one of a smooth skirt, a pleated skirt (or Z-shaped skirt), or a wave skirt (or wave-shaped skirt). The image processing unit (318) can generate wrinkle features of the skirt, such as corner points, a wrinkle number, a wrinkle size, and/or a wrinkle area ratio. Skirt parameters (320) generated by the parameter prediction module (300B) can be provided to the skirt generation module (300A) to generate a 3D skirt model (314) of the skirt.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Figure 4:
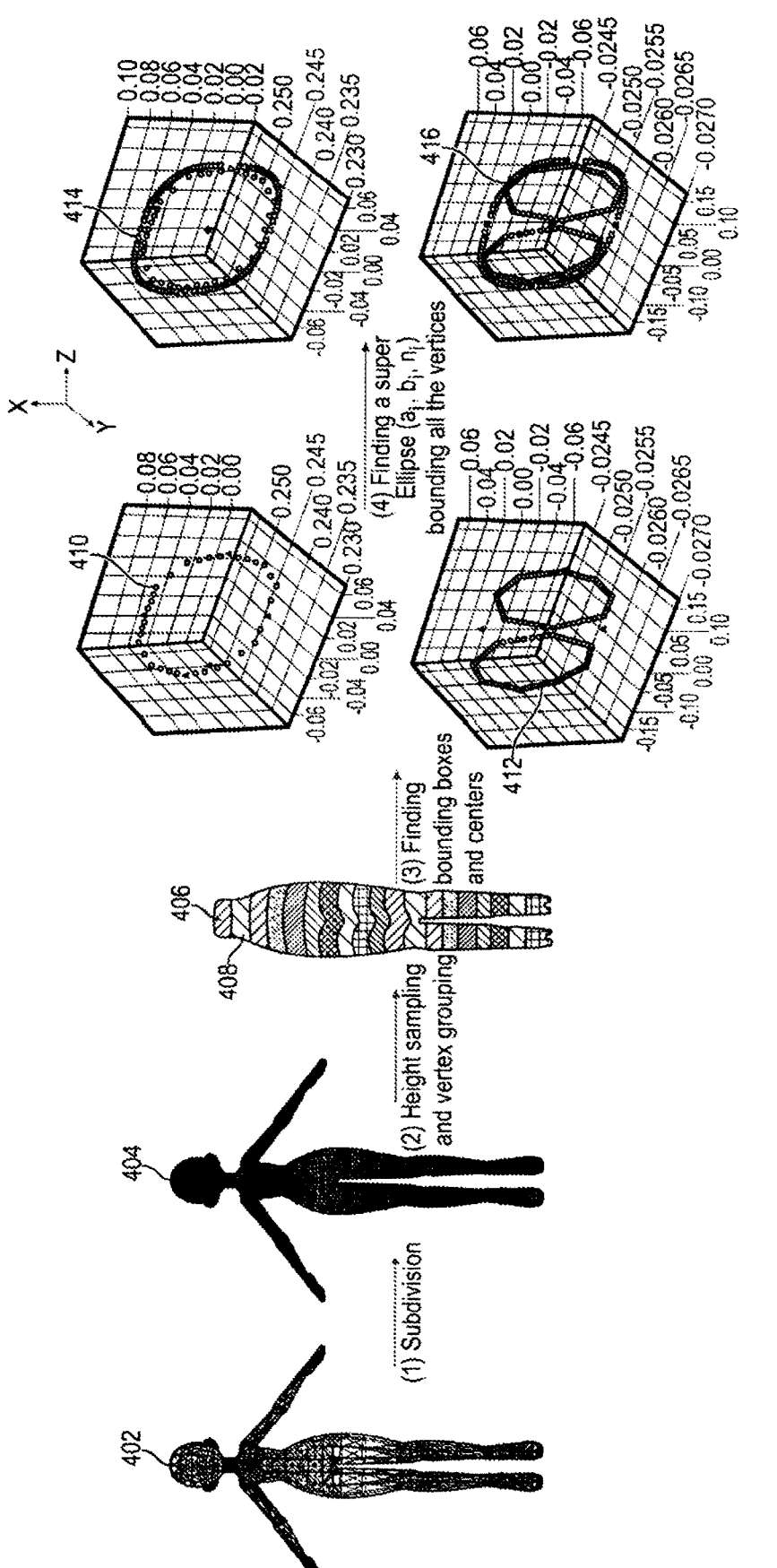
FIG. 4 is a schematic illustration of an exemplary pipeline of a body silhouette extraction.

In the body silhouette extraction unit (302), a body silhouette can be extracted from a 3D model (e.g., a 3D nude model) to prevent a skirt from falling into an inner body. The 3D nude model can be a 3D mesh of a body that is generated based on one or more 2D images in which the body is included in the one or more 2D images. The 3D nude model can be computer-generated or manually constructed. FIG. 4 shows an exemplary pipeline of extracting a body silhouette of a body from a 2D image based on the body silhouette extraction unit (302). As shown in FIG. 4, the body silhouette extraction unit (302) can extract a body silhouette from the 2D image based on steps as follows.

(1) In step 1, a mesh (402) of the body can be subdivided. The mesh (402) can be a 3D mesh of a body that is computer generated or manually created based on one or more 2D images. In an exemplary embodiment of the disclosure, the mesh (402) of the body is manually constructed. The body can be subdivided with a mid-point subdivision method for example. Based on the mid-point subdivision method, each line segment of the mesh (402) can be bisected into equal halves. The mesh (402) can be subdivided into a mesh (404) that includes more line segments than the mesh (402).

(2) In step 2, a set of height values on a lower body $\{h_i | i=1,2,3, \ldots . N\}$ can be uniformly sampled. For each height value $h_i$, the vertices in a vertex set with $\{v_i | v_{iy} < h_i + \delta \& v_{iy} > h_i - \delta\}$ can be determined, where $\delta$ is a small value. For example, as shown in FIG. 4, a plurality of vertex sets, such as a vertex set (406) and a vertex set (408), can be determined. Each of the plurality of vertex sets can include a plurality of vertices and corresponds to a respective height value.

(3) In step 3, for each group (or set) of vertices $\{v_i\}$, a bounding box $\{x_{min,i}, x_{max,i}, z_{min,i}, z_{max,i}\}$ can be determined, and a central z-value can be determined as $z_{center,i} = (z_{min,i} + z_{max,i})/2$. As shown in FIG. 4, a first bounding box (410) and a second bounding box (412) can be determined.

(4) In step 4, for each group of vertices $\{v_i\}$, a bounding super-ellipse can be determined based on equation (1):

$$\left|\frac{x}{a_i}\right|^n + \left|\frac{z - z_{center,i}}{b_i}\right|^n = 1 \qquad \text{Eq. (1)}$$

where the bounding super-ellipse can be centered at $c_i = \{0, h_i, z_{center,i}\}$, with a major axis pointing towards a positive direction of the x-axis and a minor axis pointing towards a positive direction of the z-axis such that all the vertices $\{v_i\}$ falls into the super-ellipse. As shown in FIG. 4, a first bounding super-ellipse (414) corresponding to the first bounding box (410) and a second bounding super-ellipse (416) corresponding to the second bounding box (412) can be provided. In a finding process of the bounding super-ellipse, a semi-diameter of the major axis can be initialized as $$a_{i,init} = \frac{|x_{min,i}| + |x_{max,i}|}{2},$$

a semi-diameter of the minor axis can be initialized as $$b_{i,init} = \frac{|z_{min,i}| + |z_{max,i}|}{2},$$

and a super ellipse parameter can be initialized as $n_{i,init}$=2.0. When the super-ellipse based on the initial parameters (e.g., $a_{i,init}$, $b_{i,init}$, and $n_{i,init}$) cannot bound (or include) all or a certain number of the vertices, the $n_i$ can be increased up to $n_i$=4.0. If the super-ellipse with $n_i$=4.0 cannot bound all or the certain number of the vertices, the semi-diameters can be increased by $a_i$=$a_i$+$a_0$ and $b_i$=$b_i$+$b_0$ until the super-ellipse based on parameters $\{a_i, b_i, n_i\}$ can bound all or the certain number of the vertices $\{v_i\}$, where $a_0$ and $b_0$ are small values. The semi-diameters $\{a_i, b_i\}$ and the super ellipse exponent $n_i$ can further be recorded to represent the corresponding bounding super-ellipse.

(5) In step 5, the semi-diameters $\{a_i|i=1,2,3, \ldots . N\}$, $\{b_i|i=1,2,3, \ldots . N\}$ and the super ellipse exponent $\{n_i|i=1, 2,3, \ldots . N\}$ can be saved as the silhouette (e.g., body silhouette) parameters.

To meet a routing requirement, a skirt template can be extracted from a previously constructed skirt. The previously constructed skirt can be a 3D mesh that is manually constructed. The manually generated skirt can be generated based on a skirt image, such as based on one or more of the 2D images (322), (324), and (326), or another skirt image. In an example, an ideal template needs to meet one or more of the rules as follows:

(1) Edge loops at different heights are sorted from up to down or from down to up.

(2) Vertices on the edge loops are sorted clockwise or counterclockwise.

(3) Distances between two loops are uniform.

(4) The template is long enough to cover all the skirts.

Figure 5:
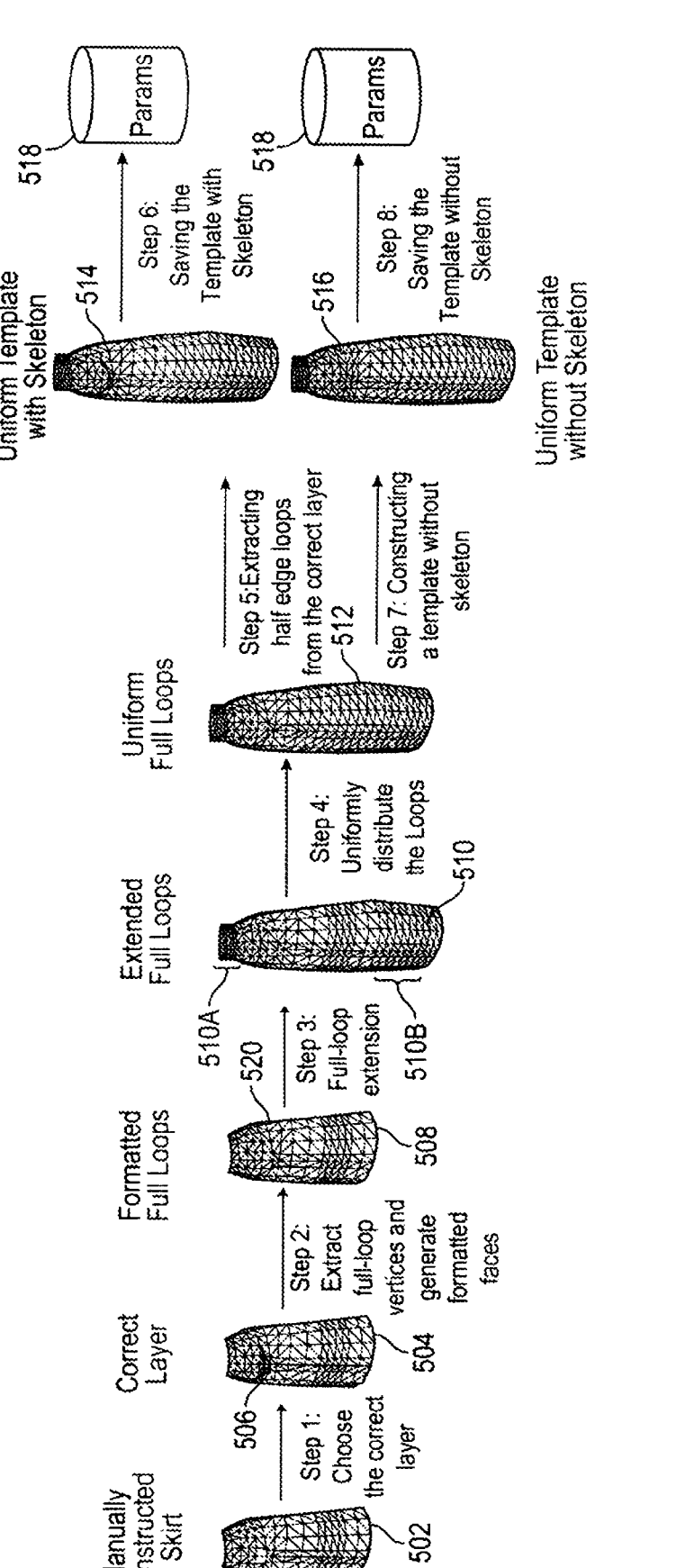
FIG. 5 is an illustration of an exemplary pipeline of an iso-surface extraction.

In some embodiments, the previously constructed skirt, such as a manually constructed skirt, may not be used as a skirt template directly for one or more of the reasons as follows:

(1) A manually constructed skirt may contain multiple layers. For example, as shown in FIG. 5, a manually constructed skirt 502 can include multiple layers at a top region.

(2) Even if each edge loop contains a same number of vertices, vertices and faces may not be organized, which cannot be used as the template for routing.

(3) Distances between two edge loops may not be uniform.

(4) The existing skirt (e.g., the manually constructed skirt) may not be long enough to act as a template for other skirts.

In the disclosure, the template extraction unit (304) can generate a template from a previously constructed skirt, which can be manually constructed or generated by computer software, by making changes as follows:

(1) A proper layer (e.g., a foreground layer) of the previously constructed skirt (e.g., manually constructed skirt) can be selected as the template.

(2) Sequences of the vertices and faces can be adjusted. For example, vertices on different loops are sorted from up to down. Vertices on an edge loop are sorted clockwise. Accordingly, a first vertex can be located on a right waist of the skirt temple. For example, a first vertex is located on a right waist (520) of the skirt template as shown in FIG. 5.

(3) Distances between edge loops can be adjusted such that the edge loops are distributed uniformly.

(4) The template can be extended from an upper side and/or a lower side such that the template is long enough to cover other skirts.

An exemplary process of generating a skirt template can be described as follows and shown in FIG. 5 correspondingly:

(1) In step 1, a proper layer (504) (e.g., a foreground layer or an external layer) of a manually constructed skirt (MCS) (502) can be extracted as a base of the template.

(2) In step 2, full-loop (or full edge loop) vertices, for example all full-loop vertices, can be extracted from the proper layer (504) of the manually constructed skirt (502) and sequences of the vertices can be adjusted. For example, vertices on different full loops (or full edge loops) can be sorted from up to down. Vertices on each edge loop (or each full edge loop) can be sorted in a clockwise direction or an anticlockwise direction. Thus, a first vertex can be located on a right side of a waist (520). Further, formatted faces can be generated based on the full-loop vertices. As shown in FIG. 5, formatted full loops (508) can be formed when the step 2 is completed.

(3) In step 3, the formatted full loops (508) can be extended by adding vertices on an upper side and/or a lower side of the full-loop vertices. As shown in FIG. 5, the formatted full loops (508) can be extended into extended full loops (510) in which full loops (510A) can be added to the upper side of the formatted full loop (508) and full loops (510B) can be added to the lower side of the formatted full loops (508).

(4) In step 4, distances between two respective full edge loops of the full edge loops can be adjusted. Thus, the full edge loops can be distributed uniformly. As shown in FIG. 5, uniform full loops (512) can be formed after the distance are adjusted.

(5) In step 5, half-loop (or half edge loop) vertices and faces (506) can be extracted from the correct layer (504). The half edge loop vertices and faces (506) can indicate a skeleton (or body silhouette) of a body.

(6) In step 6, the vertices and faces of the full edge loops and the half edge loops can be saved in a database or a memory structure (518) as a template (514) with a skeleton.

(7) In step 7, a template (516) without a skeleton (e.g., without half-edge loops or half-loop vertices) can be constructed. For example, the vertices and faces of the half edge loops can be removed from the uniform full loops (512) to obtain the template (516) without a skeleton.

(8) In step 8, the vertices and faces of the full edge loops in the template (516) without a skeleton can also be saved to the database or the memory structure (518).

Figure 6:
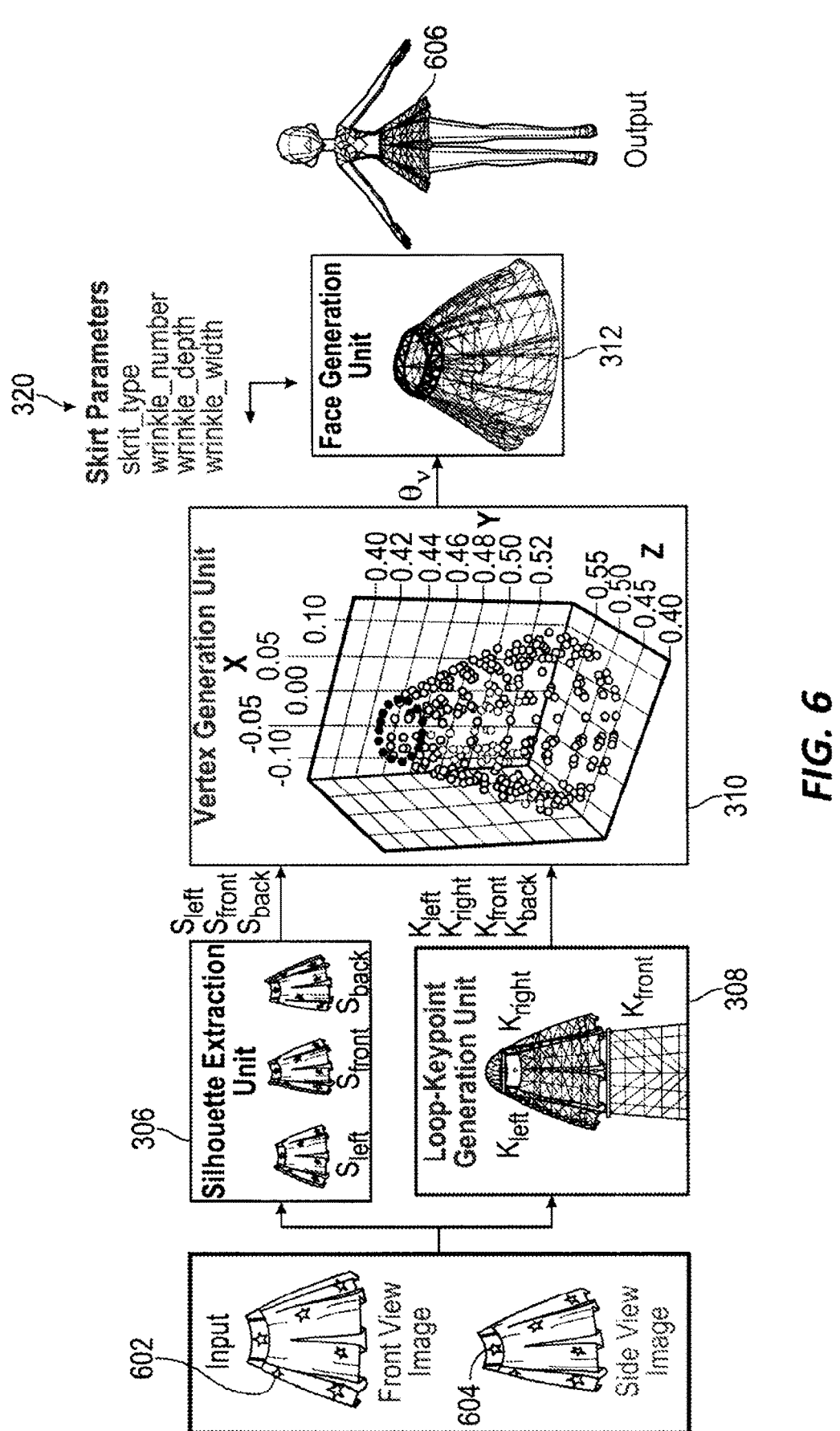
FIG. 6 is an illustration of an exemplary pipeline of a skirt template extraction.

FIG. 6 shows an exemplary pipeline of a skirt reconstruction stage. In the skirt reconstruction stage, the skirt reconstruction module (or skirt generation module) can take a front-view mask (602) (also referred to as a front-view image which is a binary image, use 1 or 0 to indicate whether a pixel exists) $I_{front}$, a side-view mask (604) (or side-view image) $I_{side}$, and input parameters (e.g., the skirt parameters (320)) as the input and generates, or exports, a 3D skirt mesh (606).

As shown in FIG. 6, in the skirt generator (or skirt generation module), the silhouette extraction unit (306) can extract a left silhouette $S_{left}$ from the front view image (602) and extract a front silhouette $S_{front}$, and a back silhouette $S_{back}$ from the side view image (604). The loop-keypoint generation unit (308) can generate a left-keypoint $K_{left}$, a right-keypoint $K_{right}$, a front-keypoint $K_{front}$, and a back-keypoint $K_{back}$ of edge loops (e.g., the full edge loops generated by skirt template extraction unit (304)) with a given template (e.g., the skirt template generated by skirt template extraction unit (304)) and the silhouettes (e.g., $S_{left}$, $S_{front}$, and $S_{back}$). The vertex generation unit (310) can generate vertex coordinates $V_{skirt}$ and loop angles $\theta_v$ of the vertices based on given skirt parameters $F_{skirt}$ (e.g., $F_{skirt}$ (320)) and loop key points (e.g., $K_{left}$, $K_{right}$, $K_{front}$, $K_{back}$). The face generation unit (312) can generate the faces of the 3D model based on the given skirt parameters $F_{skirt}$ and vertex loop angles $\theta_v$. Finally, the vertex coordinates $V_{skirt}$ and the faces $F_{skirt}$ can be assembled to generate the 3D model $Mesh_{skirt}$ (606).

Figures 7, 8:
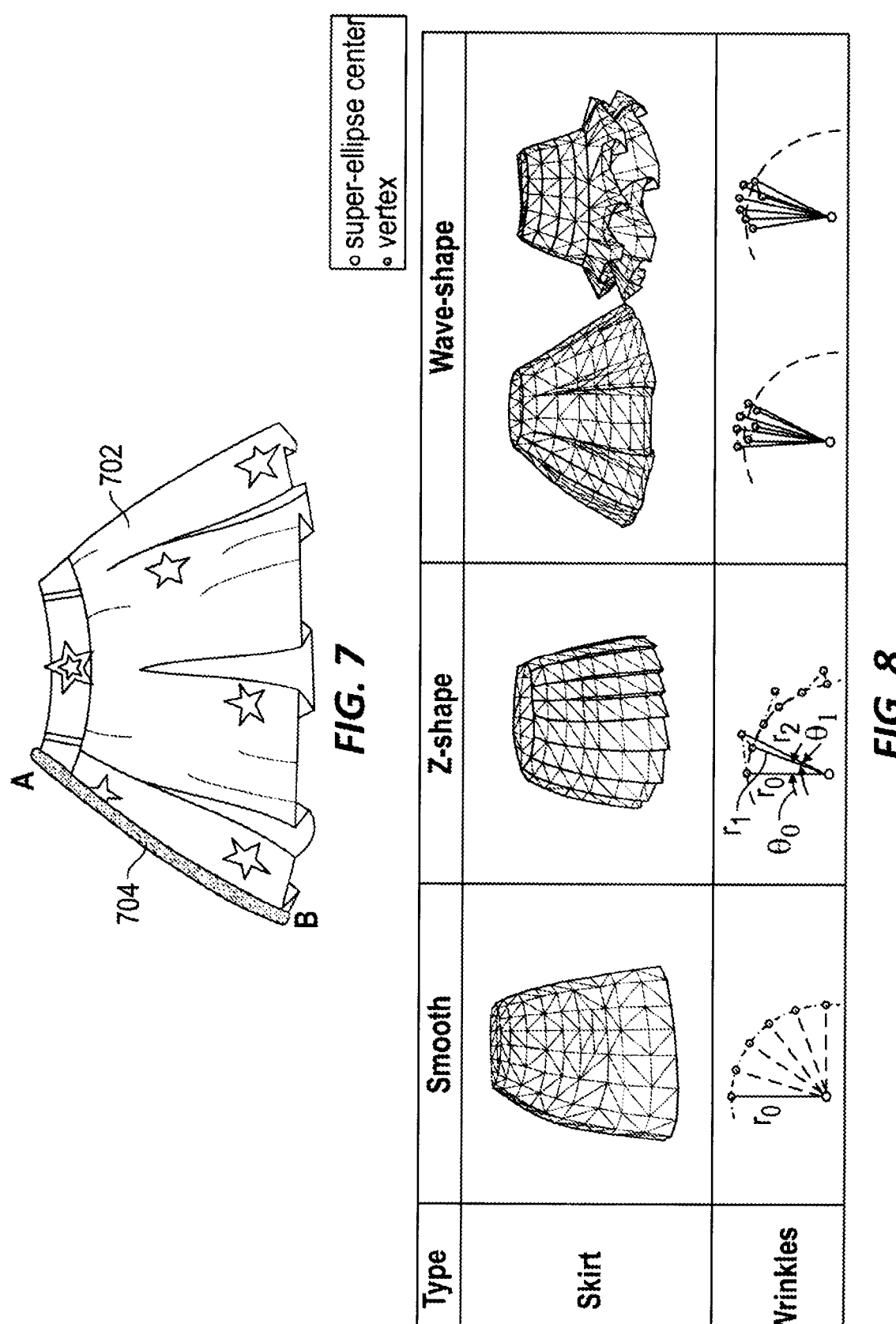
FIG. 7 is an illustration of an exemplary pipeline of a skirt reconstruction.
FIG. 8 shows exemplary skirt types in accordance with some embodiments.

FIG. 7 shows an exemplary left silhouette (704) determined based on a front view mask (or front view image) $I_{front}$ (702). The skirt silhouette extraction unit (306) can take the front view mask $I_{front}$ (702) as an input to determine the left silhouette (704). As shown in FIG. 7, given a left upper bound A in a y-axis for the front-view image $y_{left,upper} \in Z^+$ ($Z^+$ indicates Z>0) and a left lower bound B in the y-axis for the front-view image $y_{left,lower} \in Z^+$, to extract the left silhouette (704), for each y-coordinate with $y_{left,upper} < y < y_{left,lower}$, a smallest x (or a minimum x-coordinate) that meets a condition of $M_{front}(x, y)>0$ ($M_{front}$ indicates the front-view image (702)) can be determined as a x-coordinate corresponding to the y-coordinate of the left silhouette $S_{left,y}$. Thus, a left silhouette $S_{left}$ (704) can be defined as $S_{left}=\{min_x(M_{front} (x, y)>0|y_{left,upper}<y<y_{left,lower}\}$, which can be shown as a line segment defined between A and B in FIG. 7. In a similar way, a front silhouette $S_{front}$ of the front-view image (702) can be defined as $S_{front}=\{min_z(M_{side} (z, y))|y_{front,upper}<y<y_{front,lower}\}$ and a back silhouette $S_{back}$ can be defined as $S_{back}=\{max_z(M_{side}(z, y))|y_{back,upper}<y<y_{back,lower}\}$ from a side-view image (e.g., (604)).

Key points for skirt edge loops can be generated based on one or more steps as follows:
(1) Template loops (e.g., the full loops in the template (516)) can be applied to determine the key points. For each loop of the template (e.g., (516)), whether a center of the loop is covered by the front-view image (e.g., (602)) or the side-view image (e.g., (604)) can be checked. If the center of the loop is covered by the front-view image of the side-view image, the temple (e.g., (516)) can be qualified for skirt generation.
(2) An upper-loop of the template loops can be aligned to a top of the skirt in the front-view image or the side-view image, and a bottom loop of the template loops can be aligned to a bottom of the skirt.
(3) For each loop with a id $t \in T_s$, ($T_s$: template loops), a loop center $P_{center,t} \in \mathbb{R}^3$, a left point $P_{left,t} \in \mathbb{R}^3$, a front point $P_{front,t} \in \mathbb{R}^3$, and a back point $P_{back,t} \in \mathbb{R}^3$ of the loop t can be determined as key points. $\mathbb{R}^3$ can indicate all coordinates in a 3D space which covers the template (e.g., (516)) that is generated by the template extraction unit.

The skirt in the front-view image or the side-view image can be considered as a stack of super-ellipses (or a stack of full edge loops). For different type of skirts, samples (or vertices) can be generated by controlling a rotation radian (or rotation angle) $\theta$ and a radius r for each of vertices on the super-ellipses. FIG. 8 shows an exemplary arrangement of vertices in different types of skirts. The types of the skirt can include at least one of a smooth-shaped skirt, a Z-shaped (or pleated-shaped) skirt, or a wave-shaped skirt. As shown in FIG. 8, by controlling the rotation radians and the radii of the vertices on the super-ellipses, different types of skirts can be generated by jittering (or adding) vertices on the super-ellipses.

A process of adding vertices on the super-ellipses can be described based on adding vertices in a t-th edge loop (or t-th super-ellipse) of the super-ellipses. In an example, the vertices can be generated in two steps as follows:
(1) In step 1, two half super-ellipses can be generated to form an edge loop (or a full edge loop). The two half super-ellipse can include a front side and a back side and determined based on key points determined by the loop-keypoint generation unit (308). A center of the half super-ellipses can be the center key point $P_{center,t}$. In a major-axis of the t-th super ellipse (or t-th edge loop), a diameter of the t-th half super-ellipses can be $a_t=|P_{left,t}-P_{center,t}|$. In a minor axis, a first diameter of the t-th half super-ellipses can be $b_t=|P_{front,t}-P_{center,t}|$ toward the front side and a second diameter of the t-th half super-ellipses can be $b_t=|P_{back,t}-P_{center,t}|$ toward the back side.
(2) In step 2, vertices can be generated by jittering samples (e.g., adding vertices) on the half super-ellipses. The vertices can be jittered based on the type of the skirt.

When the skirt is a smooth-skirt (or smooth-shaped skirt), for each edge loop, $M_s/2$ groups of points can be jittered on the front half-super ellipse and $M_s/2$ groups of points can be jittered on the back half-super ellipse of the t-th edge loop. $M_s$ can be a predefined number of groups on each edge loop. In an example, $M_s$ can be in a range between 4 and 20. In each group, one vertex can be added. Since the skirt is the smooth-shaped skirt, vertices may not be added on the t-th edge loop, and $r_{jitter,i}=0$ and $\theta_{jitter,i}=0$.

When the skirt is a Z-shaped skirt, the Z-shaped skirt can include edge loops between an uppermost edge loop $t_u$-th edge loop and a lowermost edge loop $t_d$-th edge loop. $M_z/2$ groups of points (or vertices) can be generated on each front half-super ellipse and $M_z/2$ groups of points (or vertices) can be generated on each back half-super ellipse, where $M_z$ can be a predefined number (e.g., 4-20) of wrinkles. In some examples, the predefined number of wrinkles may be specified by a user, a default value, or predicted by the parameter prediction module.

For the $t_u$-th edge loop (e.g., a first or uppermost edge loop of the Z-shaped skirt), two vertices can be included in each group, with one vertex for a wrinkle region of the skirt and one vertex for a non-wrinkle region of the skirt. In some embodiments, the $t_u$-th edge loop can be smooth. Thus, additional vertices may not need to be added on the $t_u$-th edge loop, and $r_{jitter,i}=0$ and $\theta_{jitter,i}=0$.

For a t-th loop that is positioned as $t_u+1 \leq t \leq t_d$, ($t_u+1$ indicates a second edge loop subsequent to $t_u$), three vertices can be included in each group, with two vertices for the wrinkle region and one vertex for the non-wrinkle region. Vertices jittered in the non-wrinkle region can have $r_{jitter,i}=0$ and $\theta_{jitter,i}=0$. Vertices jittered in the wrinkle region can have rotation radians and radii specified by a user or can be predicted by the parameter prediction module.

When the skirt is a wave-shaped skirt, for each edge loop, $M_w/2$ groups of points (vertices) can be generated on the front half-super ellipse and $M_w/2$ groups of points (or vertices) can be generated on the back half-super ellipse, where $M_w$ can be a predefined number of wrinkles, for example specified by a user or predicted by the parameter prediction module. In an example, $M_w$ can be in a range between 4 and 20.

For a $t_u$-th edge loop (e.g., a first edge loop of the wave-shaped skirt), two vertices can be determined, with one vertex for the wrinkle region and one vertex for the non-wrinkle region. In some embodiments, the $t_u$-th edge loop can be smooth, thus, no additional vertices are jittered (or added) on the $t_u$-th edge loop, and $r_{jitter,i}=0$ and $\theta_{jitter,i}=0$.

For a t-th loop with $t_u+2 \leq t \leq t_d$, 8 vertices can be determined in each group, with 7 vertices for the wrinkle region and one vertex for the non-wrinkle image. Rotation radians and radii of the 8 vertices can be shown in Table 2.

For a $(t_u+1)$-th edge loop (e.g., a second edge loop of the wave-shaped skirt), two situations can be applied. In a first situation, when the user chooses to change the wrinkle gradually (e.g., a transition between the first edge loop and the second edge loop is less than a threshold), 4 vertices can be determined in each group, with three vertices for the wrinkle region and one vertex for the non-wrinkle region. In some embodiments, the 3 vertices in the wrinkle region can be $3^{rd}$-$5^{th}$ vertices shown in the wrinkle region of Table 2, and the one vertex in the non-wrinkle region can be the vertex shown in the non-wrinkle region of Table 2. If the user chooses to change the wrinkle suddenly (e.g., a transition between the first edge loop and the second edge loop is equal to or larger than the threshold), 8 vertices can be determined in each group, with 7 vertices for the wrinkle region and one vertex for the non-wrinkle region. Radii and rotation angles (or rotation radians) of the 8 vertices can be shown in Table 2.

Table 2 shows the radius $r_{jitter,i}$ and the rotation radian $\theta_{jitter,i}$ of vertices in a i-th group of a t-th loop with $t_u+1 \leq t \leq t_d$ for a wave-shaped skirt, where $r_{w,X}$ and $\theta_{w,X}$ ($1 \leq X \leq 7$) are radius offsets and radian offsets of the wave-shaped skirt. Parameters shown in Table 2 can be specified by the user or predicted by the parameter prediction module, for example.

TABLE 2

| Rotation radians and radii for vertices in an edge loop | | | |
|---|---|---|---|
| The i-th group of vertex | Vertex ID | $r_{jitter,i}$ | $\theta_{jitter,i}$ |
| Wrinkle Region | 1 | $r_{w,1}$ | $\theta_{w,1}$ |
| | 2 | $r_{w,2}$ | $\theta_{w,2}$ |
| | 3 | $r_{w,3}$ | $\theta_{w,3}$ |
| | 4 | $r_{w,4}$ | $\theta_{w,4}$ |
| | 5 | $r_{w,5}$ | $\theta_{w,5}$ |
| | 6 | $r_{w,6}$ | $\theta_{w,6}$ |
| | 7 | $r_{w,7}$ | $\theta_{w,7}$ |
| Non-wrinkle Region | 1 | 0 | 0 |

Faces for the 3D model can be generated based the type of the skirt through the face generation unit. For example, faces for a smooth-shaped skirt can be generated based on a smooth-skirt face generation subunit, faces for a Z-shaped skirt can be generated based on a Z-shaped skirt face generation subunit, and faces for a wave-shaped skirt can be generated based on a wave-shaped skirt face generation subunit.

When the skirt is a smooth-shaped skirt, template faces (e.g., the faces included in the skirt template generated by template extraction unit) corresponding to valid loops (e.g., the edge loops generated based on the vertex generation unit) can be determined as generated faces for the smooth-shaped skirt.

Figure 9:
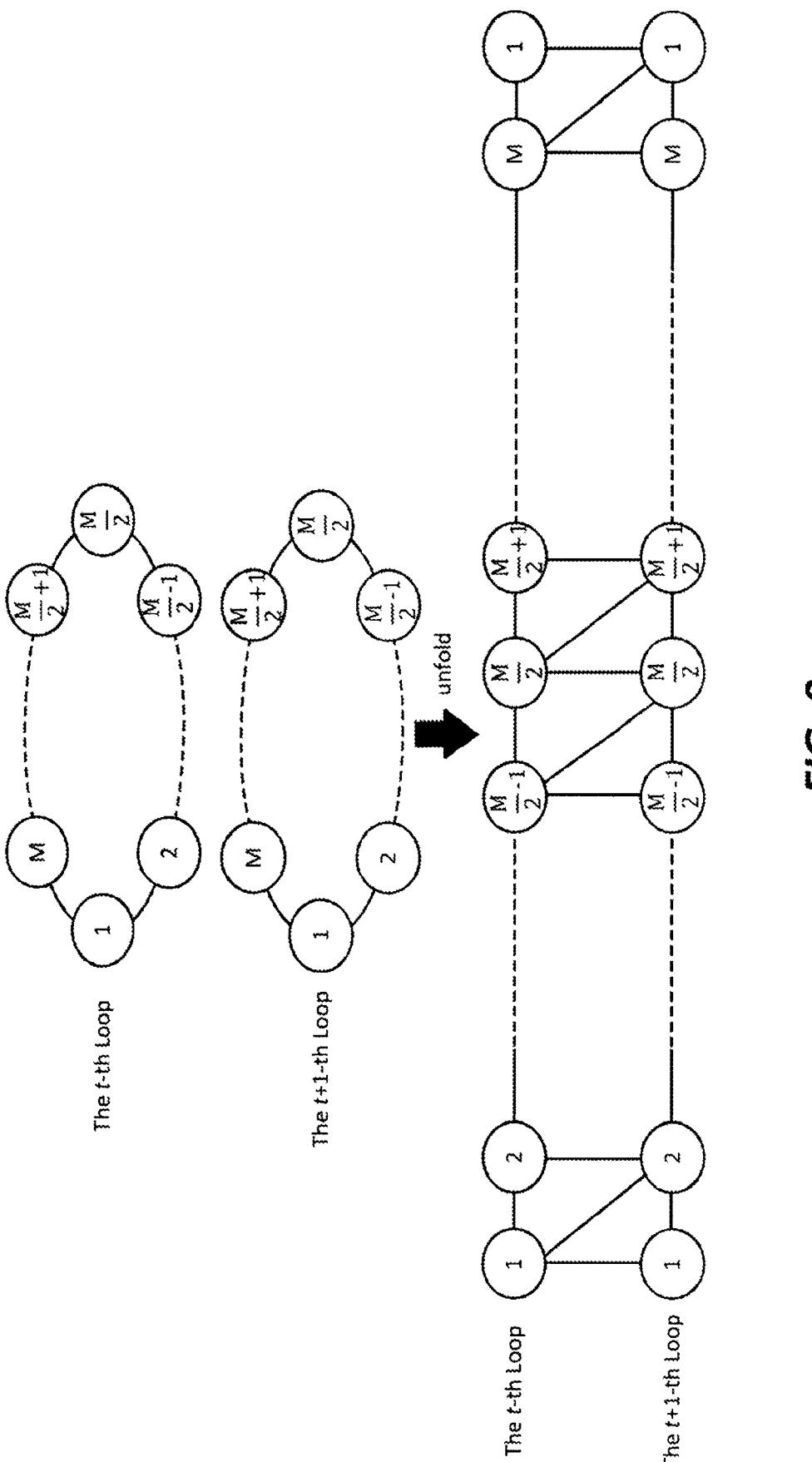
FIG. 9 shows a first exemplary process of a face generation in accordance with some embodiments.

When the skirt is a Z-shaped skirt or a wave-shaped skirt, uniformly distributed faces can be generated between two adjacent loops if the two adjacent loops have a same number of vertices. As shown in FIG. 9, two triangles can be generated to connect a i-th vertex of a t-th loop to a i-th vertex of a (t+1)-th loop, a (i+1)-th vertex in the t-th loop and the (t+1)-th vertex in the (t+1)-th loop, and the i-th vertex of the t-th loop to the (i+1)-th vertex in the (t+1)-th loop.

If the two adjacent loops have a different number of vertices, faces can be generated one by one. Firstly, two vertex pointers can be initialized to set a position index of a first vertex in the upper loop as pu=1, (pu indicates a position index in an upper loop of the two adjacent loops) and set a position index of a first vertex in the lower loop as pd=1.

Figure 10:
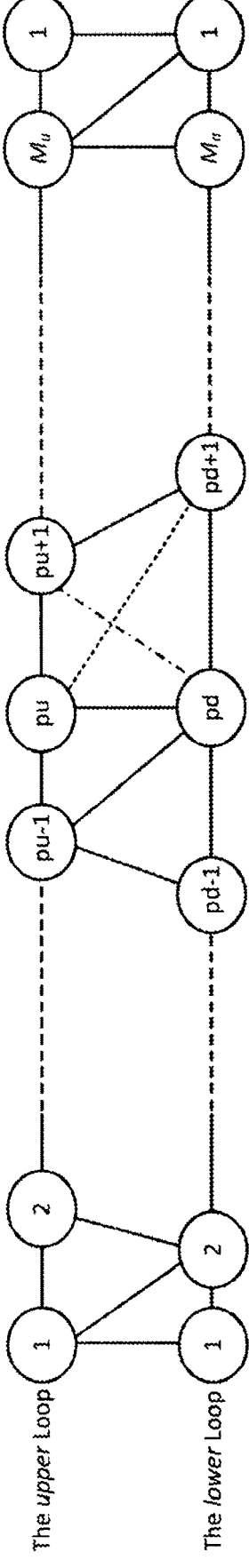
FIG. 10 shows a second exemplary process of a face generation in accordance with some embodiments.

As shown in FIG. 10, based on the position index pu in the upper loop and the position index pd in the lower loop, a triangle containing pu and pd can be determined. For example, a first candidate triangle (pu, pd, pu+1) or a second candidate triangle (pu, pd, pd+1) can be determined based on the position indices pu and pd. To choose a more reasonable triangle, a Euclidian distance between the (pu+1) and pd, denote $l_{pu+1,pd}$ and a Euclidian distance between the (pd+1) and pu, denote $l_{pd+1,pu}$ can be calculated. If $l_{pu+1,pd} < l_{pd+1,pu}$, the first candidate triangle (pu, pd, pu+1) can be added to a list of faces and pu can be updated as pu=pu+1. Otherwise, the second candidate triangle (pu, pd, pd+1) can be added to the list of faces and pd can be updated as pd=pd+1. The face generation process may be repeated until pu=$M_u$, where $M_u$ is the number of vertices in the upper loop and pd=$M_d$, where $M_d$ is the number of vertices in the lower loop.

Figure 11:
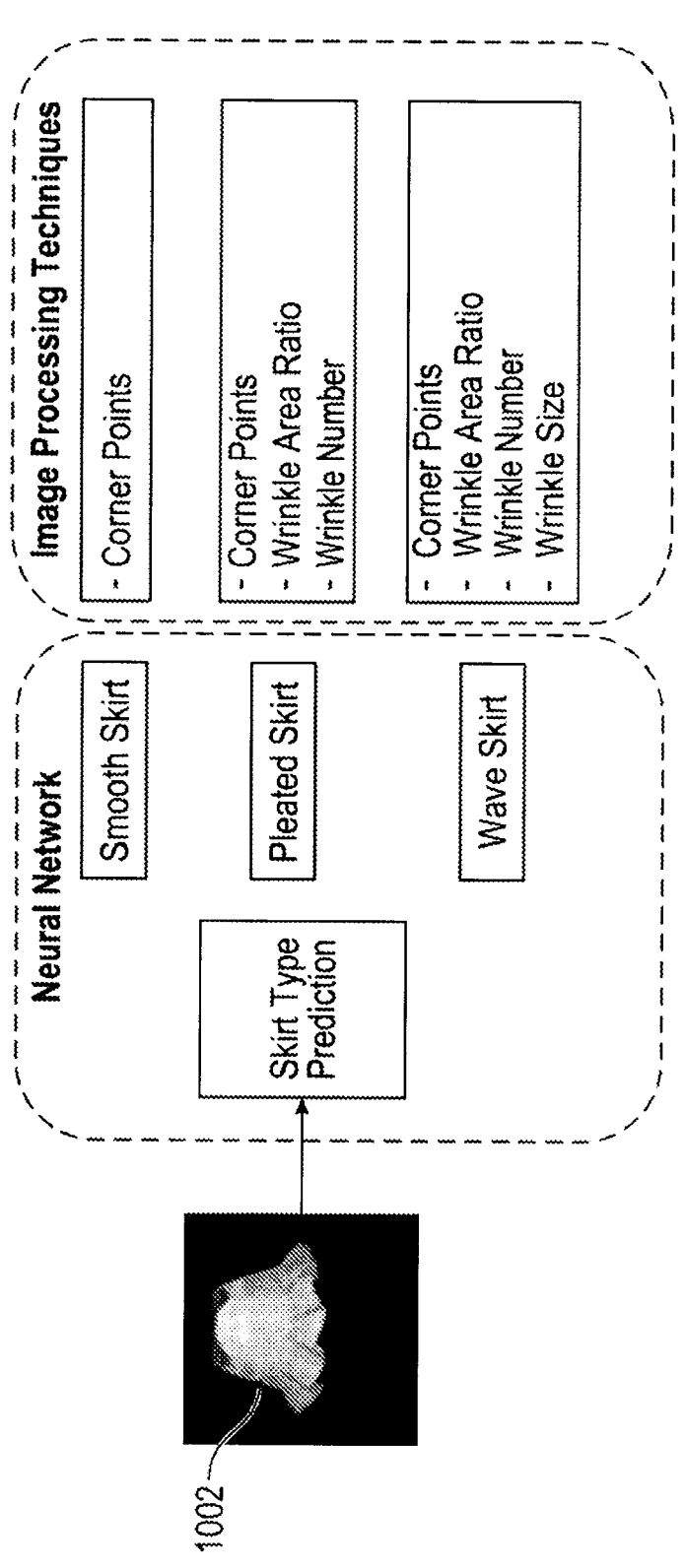
FIG. 11 is an exemplary illustration of a parameter prediction in accordance with some embodiments.

As shown in FIG. 11, the parameter prediction module can take multi-view skirt images (e.g., a front view image (1002)) of a skirt as inputs and estimate skirt parameters (e.g., a skirt type, corner points, a wrinkle area ratio, a wrinkle number, a wrinkle size or the like) of the skirt by combining the power of a deep learning neural network model (to determine the skirt type) and image processing techniques (to determined other skirt parameters, such as the corner points, the wrinkle area ratio, the wrinkle number, the wrinkle size or the like).

In an example of the disclosure, the parameter prediction module can have an overall prediction accuracy of over 90% and provide a reasonably good initial estimation of parameters for the downstream skirt reconstruction module.

Figure 12:
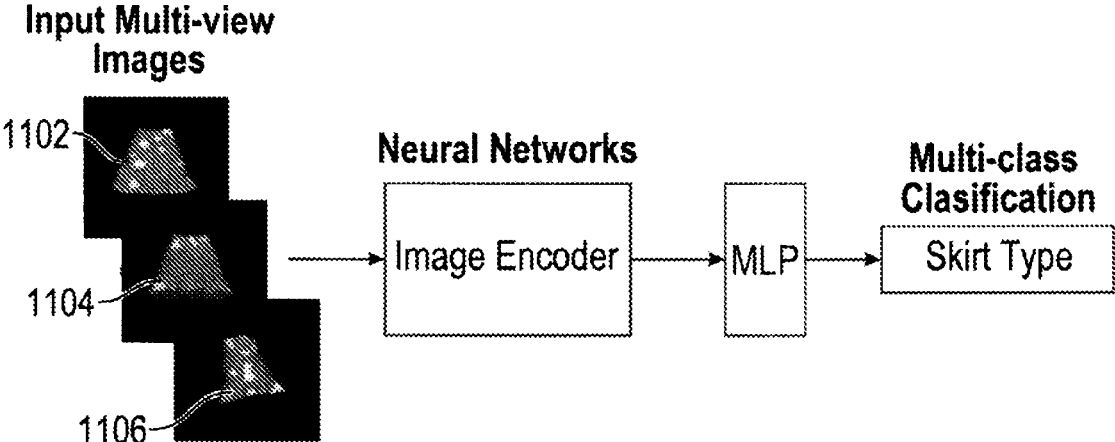
FIG. 12 is a schematic illustration of an exemplary pipeline of a skirt type prediction.

In the disclosure, a deep neural networks model can be trained to predict the skirt type from multi-view (e.g., a front view, a back view and a side view) skirt images. An exemplary training process of the deep neural networks can be shown in FIG. 12. As shown in FIG. 12, a front view skirt image (1102), a back view skirt image (1104), and a side view skirt image (1106) can be input images. The input images can first be encoded into latent vectors in an image encoder, then the latent vectors can be concatenated together and fed into multilayer perception (MLP) neural networks to predict the skirt types.

Training multi-view images and skirt type labels can be synthesized from the skirt reconstruction module (or the skirt generation module). Three types of skirts can be considered in the training process in one example. The smooth skirt (or smooth-shaped skirt) can be labeled as label 0, the pleated skirt (or Z-shaped skirt) can be labeled as label 1, and the wave skirt (or wave-shaped skirt) can be labeled as label 2. For each type of skirt, a plurality of samples, such as 1000 samples, can be synthesized based on one or more steps as follows:

(1) For one type of skirt, default values of skirt parameters (e.g., corner points, a wrinkle area ratio, a wrinkle size, a wrinkle number etc.) can be determined for skirt reconstruction.

(2) Random skirt parameters can be generated. The random skirt parameters can have values that are distributed within a specific range from default values.

(3) A skirt mesh can be reconstructed based on the generated random skirt parameters.

(4) Random textures (e.g., random geometric pattern) can be added to the skirt mesh and the 3D mesh can further be rendered for (or transformed to) the front, back and side view images.

(5) The rendered images can be converted to gray scale and resized to a resolution of 512×512 pixels.

Thus, in the training stage, random skirt parameters can be created first. The random skirt parameters are reconstructed into a skirt mesh. The skirt mesh can be rendered into skirt images (e.g., different side-view images). Therefore, a one-to-one relation between the skirt parameters (in step 2) and the skirt images (in step 5) is built. The one-to-one relation can further be applied to analyze skirt parameters of real skirt images. For example, the neural networks can be applied to determine a skirt type of skirt based on one or more 2D images of the skirt. In the training stage, the image of each view can be encoded separately by a typical 18-layer ResNet image encoder, resulting in 3 encoded latent vectors. The latent vectors can be concatenated together and fed into a MLP network. The MLP network can have 3 layers with 32, 16 and 3 neurons respectively. The synthesis data set can be split into 8:2 for training and testing. In an example, a prediction accuracy of the provided neural networks can be 98.8% on the synthesis testing data and 95% on 45 ground truth skirt samples.

Figure 13:
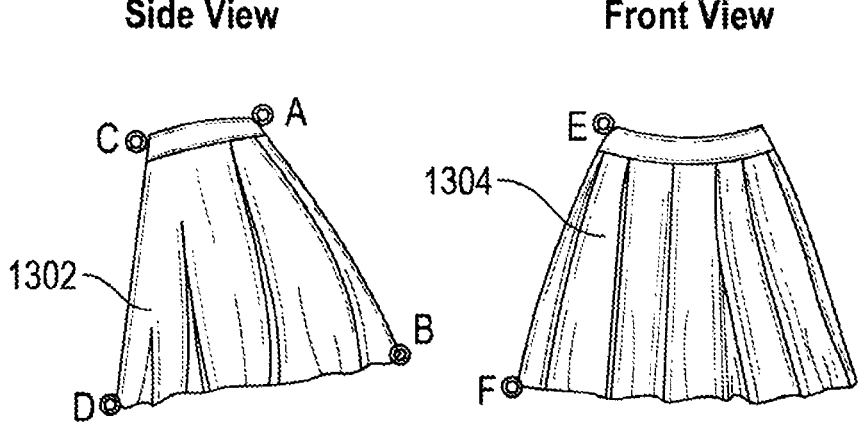
FIG. 13 shows exemplary illustrations of skirt corner points in accordance with some embodiments.
Figure 14:
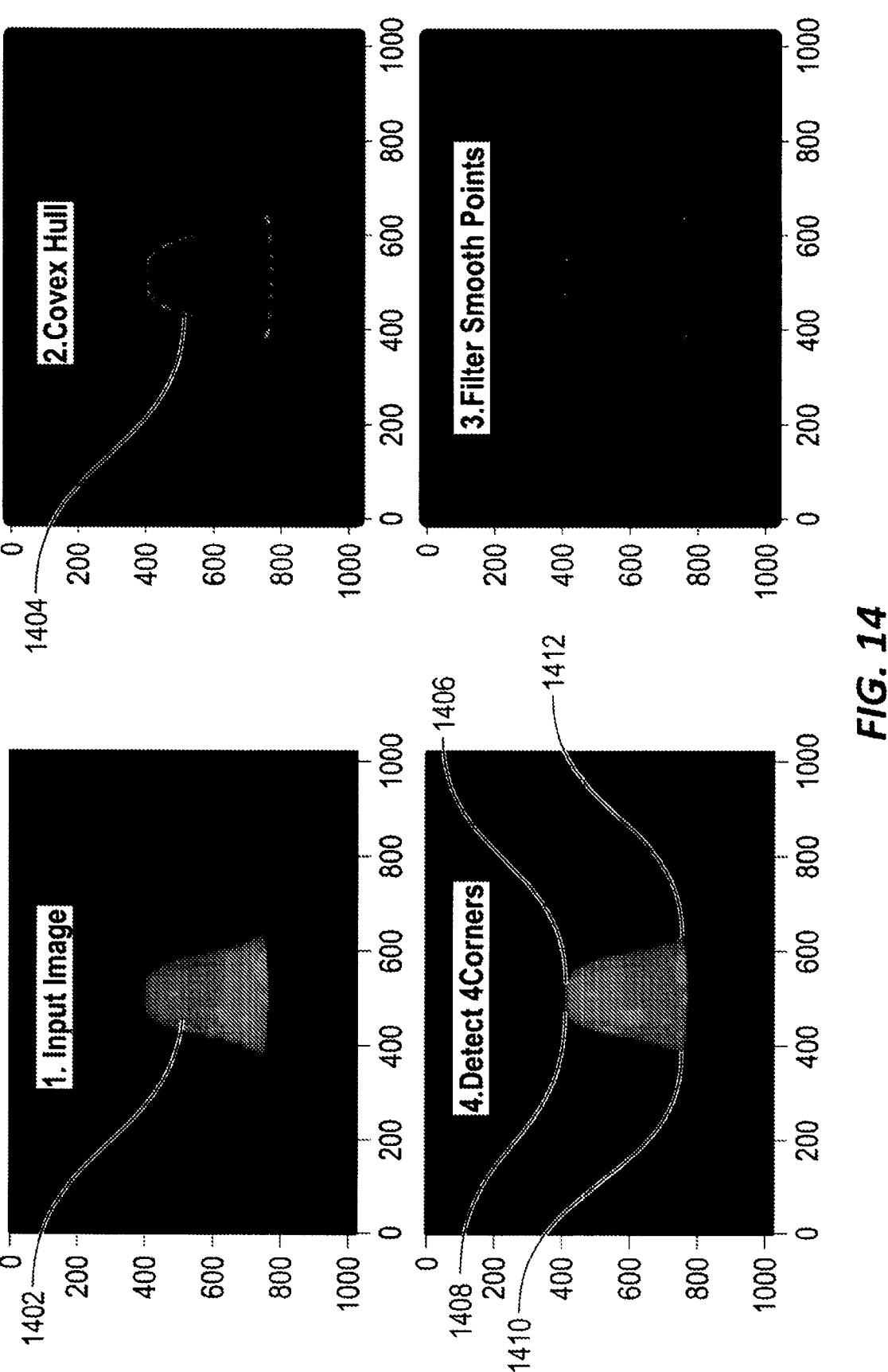
FIG. 14 is an exemplary illustration of a detection of skirt corner points in accordance with some embodiments.

Skirt corner points can be useful in determining a skirt overall silhouette in the reconstruction stage. As shown in FIG. 13, 6 key corner points of a skirt can be determined, such as 4 corners are in a side view (1302) and 2 in a front view (1304) of the skirt. An algorithm can be implemented to take the front view image and the side view skirt image as inputs and automatically detect coordinates of the corner points. An exemplary detection process can be shown in FIG. 14 based on one or more steps as follows:

(1) For an input skirt image (1402), the input skirt image can be binarized and a skirt region in the input skirt image can be set as a foreground region.

(2) A convex hull 1404 of the binary image can be extracted using any suitable image processing techniques. A convex hull can be a set of pixels in a smallest convex polygon that surrounds all the foreground region in the binary image.

(3) Smooth points can be filtered out from the convex hull (1404) and points with a large curvature can be kept (or retained). A smooth point can be defined as follows: if a distance between a point $x_i$ and a line formed by neighboring points $x_{i-1}$ and $x_{i+1}$ is less than a preset threshold, the point $x_i$ is considered as a smooth point and is removed from the convex hull point set.

(4) The four corner points can be detected based on the filtered points according to one or more rules as follows: for a point with coordinates [x, y], a point with a maximum value of (x+y) is an upper right corner point (1406), a point with a minimum value of (x+y) is an upper left corner point (1408), a point with a maximum value of (x−y) is a lower left corner point (1410), and a point with a minimum value of (x−y) is a lower right corner point (1412).

In an example, an accuracy of the corner points detection algorithm is 99.95% on 3000 synthetic data and 99% on 100 ground truth data.

Figure 15:
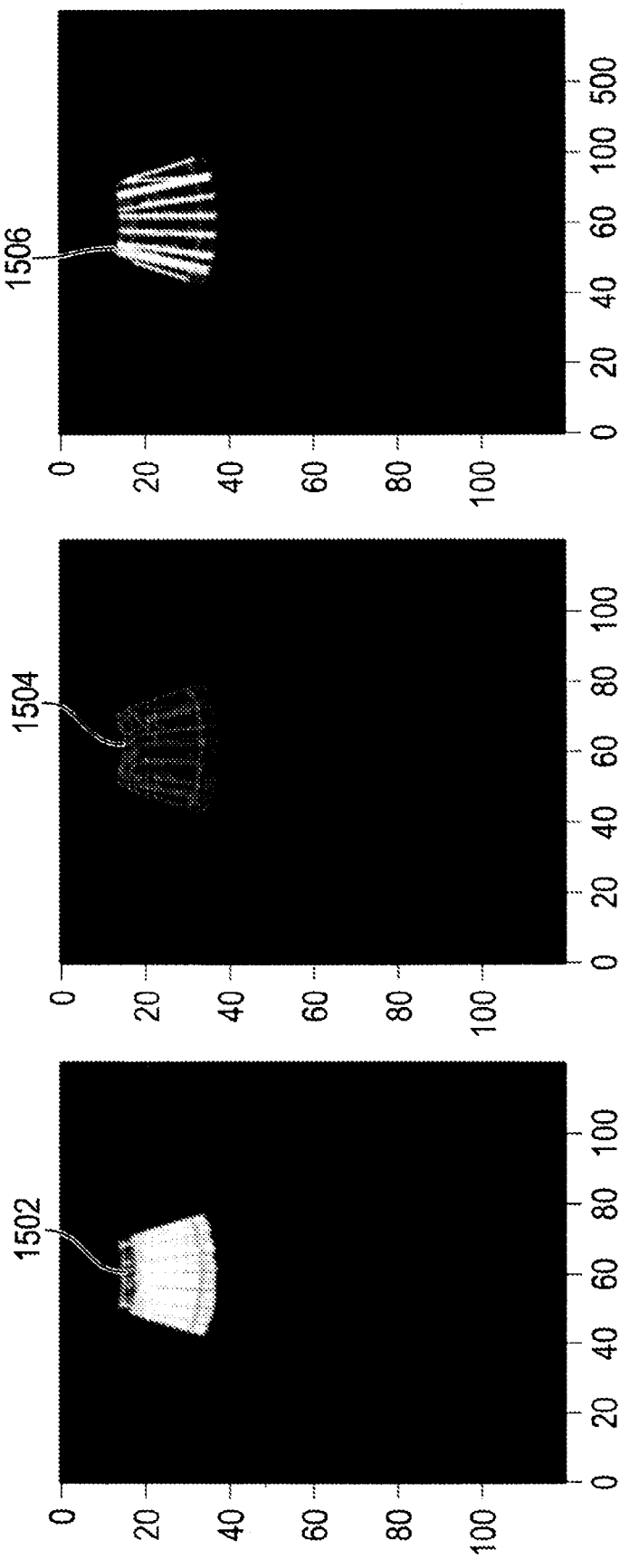
FIG. 15 is an exemplary illustration of an estimation of a skirt wrinkle number for a pleated skirt.

To estimate a wrinkle number, an algorithm can be implemented to take a front view skirt image as an input image and estimate the number of wrinkles. For a smooth skirt, the wrinkle number can be zero by default. For a pleated skirt, the wrinkle number can be estimated. The wrinkle number can be estimated from the front view skirt image by a probabilistic Hough transformation for example. FIG. 15 shows an exemplary process of estimating a skirt wrinkle number for a pleated skirt based on the probabilistic Hough transformation:

(1) An input image can be converted to gray scale. For example, as shown in FIG. 15, an input image (not shown) is converted into an image (1502) in gray scale.

(2) An edge map (1504) of the converted image (1502) in gray scale can be extracted by a standard edge detection algorithm, such as cv2.Canny( ) function in OpenCV. OpenCV is an exemplary library of programming functions mainly for real-time computer vision.

(3) In the edge map of the pleated skirt, wrinkles are represented as straight line segments. The probabilistic Hough transformation can be applied to the edge map and detect the line segments within the edge map. The probabilistic Hough transformation can be applied based on an algorithm, such as cv2.HoughLinesP( ) function in OpenCV. To avoid a texture pattern in the skirt image being detected as line segments, two criteria can be applied. First, a length of the line segment should be larger than a preset threshold, which can be set as 50% of a total height of the skirt. Second, a slope of the line segment should be within a certain range, which can be defined by a left-hand side outer edge slope and a right-hand side skirt outer edge slope in the front view image. Line segments that fail to meet these two criteria can be filtered out. As shown in FIG. 15, long line segments (e.g., 1506) with a relatively vertical slope are selected as valid line segments.

The number of wrinkles can be estimated by counting the valid line segments detected above. In an example of the disclosure, an average estimation error is 0.8 on 1000 synthesis data and 1.4 on 32 ground truth samples.

Figure 16:
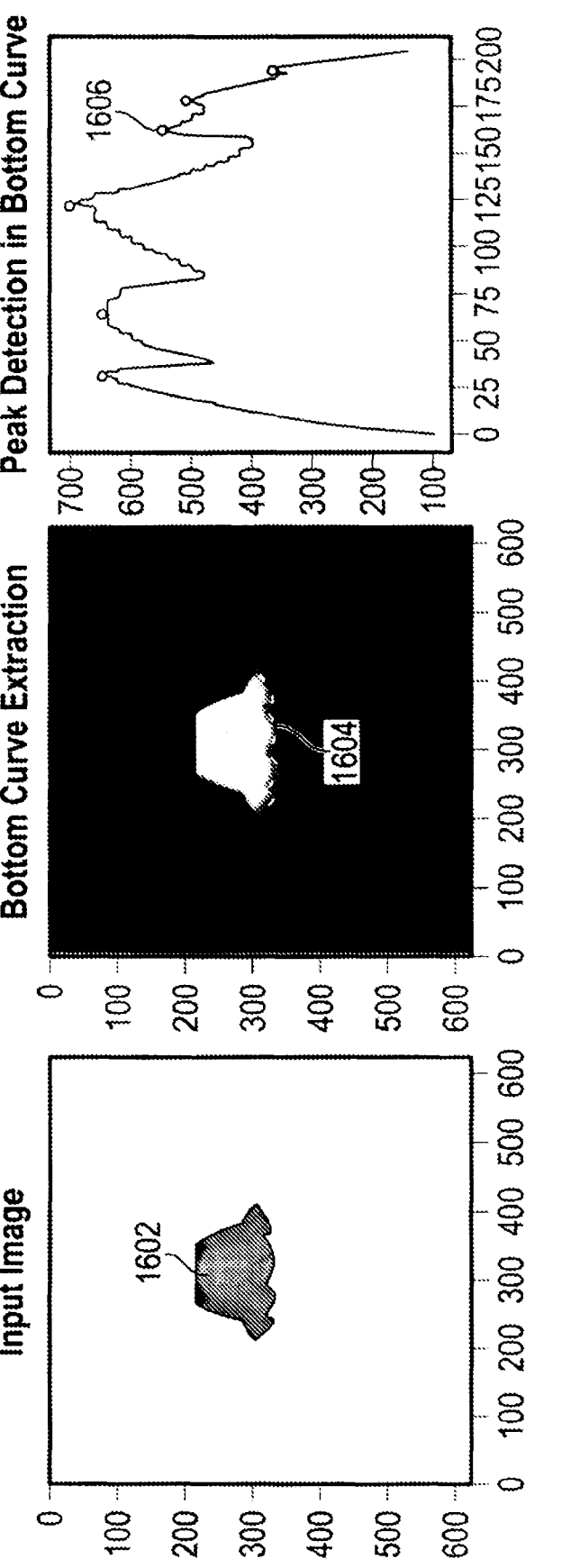
FIG. 16 is an exemplary illustration of an estimation of a skirt wrinkle number for a wave skirt.

For a wave skirt, wrinkles typically form a wavy curve at a bottom of the skirt. Thus, as shown in FIG. 16, the wrinkle number can be estimated by detecting peaks in the skirt bottom curve based on one or more steps as follows:

(1) An input front view skirt image (1602) can be converted into a binary mask (or binary image) with a skirt region of the front view skirt image being set as a foreground mask.

(2) A skirt bottom curve (1604) can be extracted from the binary mask. The bottom curve can include a list of values that represent y-axis coordinates of the skirt bottom pixels.

(3) A standard image processing algorithm, such as find_peaks( ) function in Scipy, can be applied to detect peaks in the bottom curve. A few criteria can be applied to avoid noisy fluctuations to impact the peak detection. First, a peak prominence should be greater than a preset threshold, which can be set as 1 empirically. Second, a distance between two neighboring peaks should be larger than a preset threshold, which is set as 5 empirically. As shown in FIG. 16, six peaks (e.g., 1606) can be detected in the skirt bottom curve.

The wave skirt wrinkle number can be estimated by counting a valid peak number in the skirt bottom curve. In an example of the disclosure, an average estimation error is 0.3 on 1000 synthesis data and 0.8 on 22 ground truth samples.

In the disclosure, a skirt wrinkle size can be estimated by the parameter prediction module. For a smooth skirt, no wrinkle size information is needed. For a pleated skirt, the wrinkle size can be initiated with a default value. For a wave skirt, an algorithm can be implemented to take a front view skirt image as an input and estimate a depth and a width of the wrinkles. An exemplary estimation process can be described as follows:

(1) An input front view wave skirt image can be converted into a binary mask (or binary image) (1702) and a bottom curve can be further extracted. An algorithm, such as find_peaks ( ) function in Scipy can be applied to detect peaks in the bottom curve.

(2) Valid peaks can be identified based on 3 criteria. According to a first criteria, a peak should have a prominence larger than a threshold (e.g., 1). According to a second criteria, a distance between neighboring peaks should be larger than a threshold (e.g., 5). According to a third criteria, a peak should be located inside a valid window. The valid window can be defined as a width window that covers a center part of the skirt. A left margin region and a right margin region of the skirt can be cut off (or excluded) because peaks in these marginal regions are typically clustered together and have small prominences.

(3) Peaks in the valid window can be applied to estimate a wrinkle width and a depth. The wrinkle width can be estimated as an average distance of distances between two neighboring valid peaks. A wrinkle depth can be estimated as an average prominence of prominences of the valid peaks. As shown in FIG. 17, 5 peaks in a valid window are identified as valid peaks.

Figure 18A:
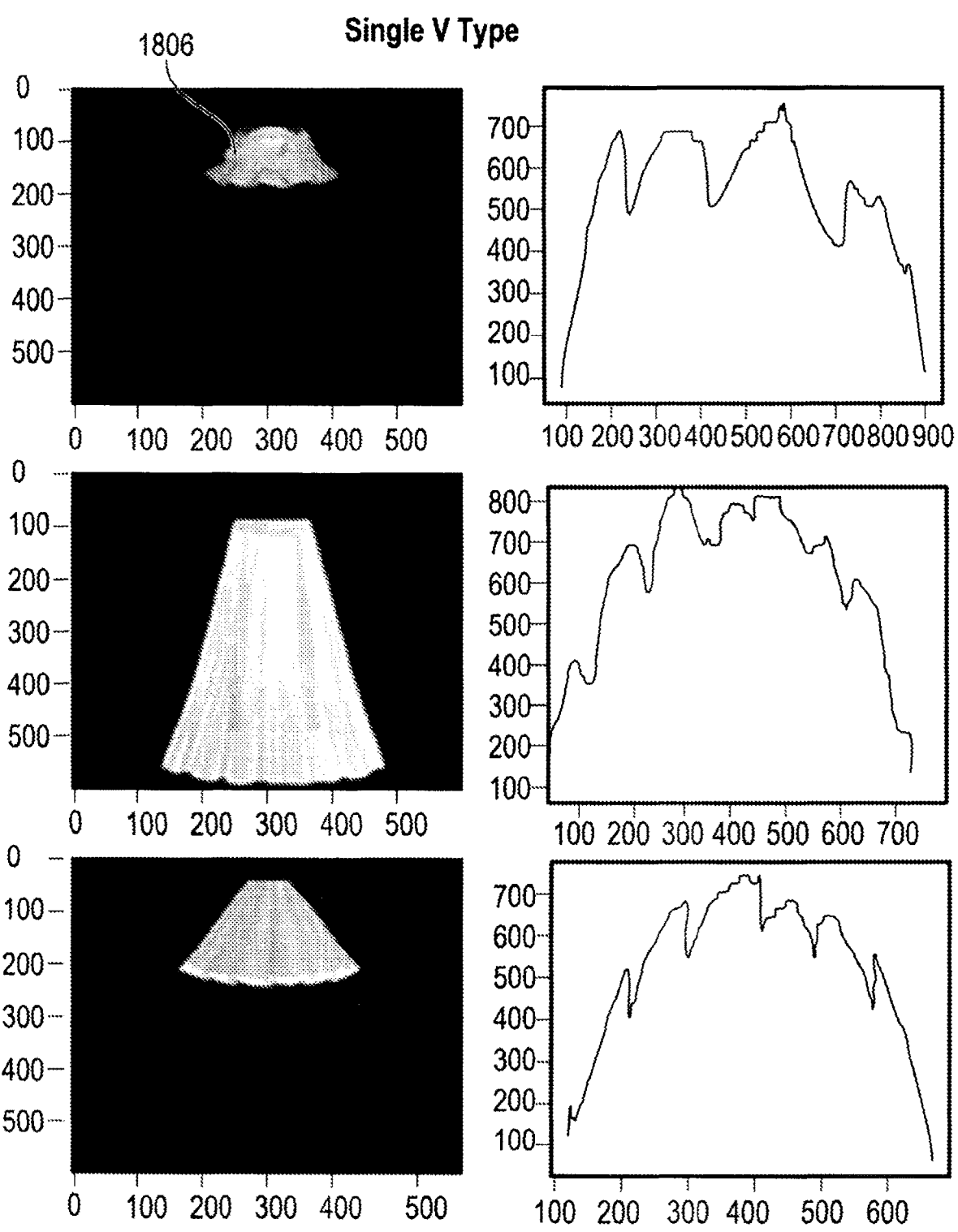
FIG. 18A is an exemplary illustration of a first wrinkle type of a wave skirt.
Figure 18B:
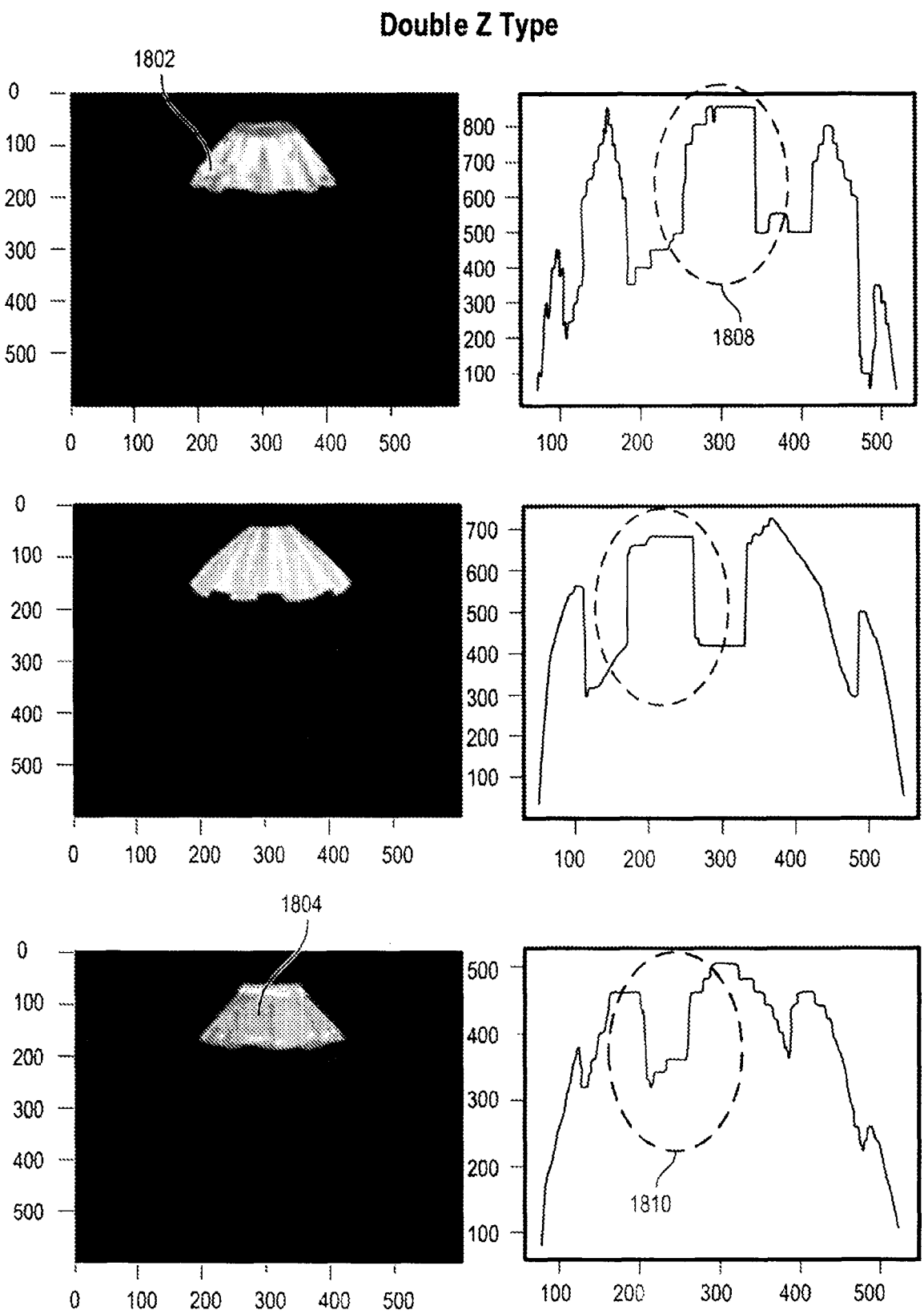
FIG. 18B is an exemplary illustration of a second wrinkle type of a wave skirt.

For a wave skirt, wrinkles of the wave skirt typically have two types of 3D structures, namely a double-Z type and a single-V type. Each type can use an individual structure template in 3D reconstruction. To differentiate the wrinkle types of the wave (or wave-shaped) skirt, an algorithm can be implemented based on one or more steps as follows:

(1) An input front view wave skirt image can be converted into a binary mask (or binary image). FIGS. 18A and 18B shows 6 types of wave-shaped skirts (e.g., (1802), (1804), and (1806)) in binary images. A bottom curve of the skirt can be extracted from the binary mask.

(2) The double-Z type wrinkles shown in FIG. 18B and the single-V type wrinkles shown in FIG. 18A can have a significant distinction in a skirt bottom curve gradient. As shown in FIG. 18B, a wrinkle can be defined as the double-Z type when a curve gradient of the wrinkle meets three criteria as follows:

(a) Gradients of all points in the bottom curve can be calculated. Points with gradients greater than a preset gradient threshold can be labeled as sharp gradient points. In an example, the gradient threshold is 3.

(b) A double-Z type wrinkle should have both a positive gradient point and a negative sharp gradient point. A positive gradient point (1808) and a negative gradient point (1810) can be shown in FIG. 18B, for example.

(c) In the meantime, a distance between a positive gradient point and a nearest negative gradient point should be less than a distance threshold. In an example, the distance threshold can be defined as a mean wrinkle width.

(3) All the non-double-Z type wrinkles can be labeled as single-V type wrinkles.

In the disclosure, a wrinkle area ratio can be determined by the parameter prediction module. For a smooth skirt, the wrinkle area ratio can be defined as one by default. For both a pleated skirt and a wave skirt, the wrinkle area ratio can be estimated as a ratio between a maximum wrinkle height of the skirt and a total skirt height. An algorithm to estimate a wrinkle area ratio can be implemented based on one or more steps as follows:

(1) An input image, such as a front view skirt image, can be converted to gray scale.

(2) An edge map of the converted input image can be extracted by a standard edge detection algorithm, such as cv2.Canny( ) function in OpenCV.

(3) In the edge map, wrinkles can be represented as straight line segments. The probabilistic Hough transformation can be applied to the edge map and detect the line segments within the edge map. In an example, the probabilistic Hough transformation can be implement based on a programming function, such as cv2.HoughLinesP( ) function in OpenCV. To avoid texture patterns in the skirt image being detected as line segments, two criteria can be applied. First, a length of a line segment can be larger than a preset threshold, which can be set as 10% of the total height of the skirt. Second, a slope of the line segment can be within a certain range, which can be preset as [−1, 1]. Line segments that fail to meet these two criteria can be filtered out.

Figure 19:
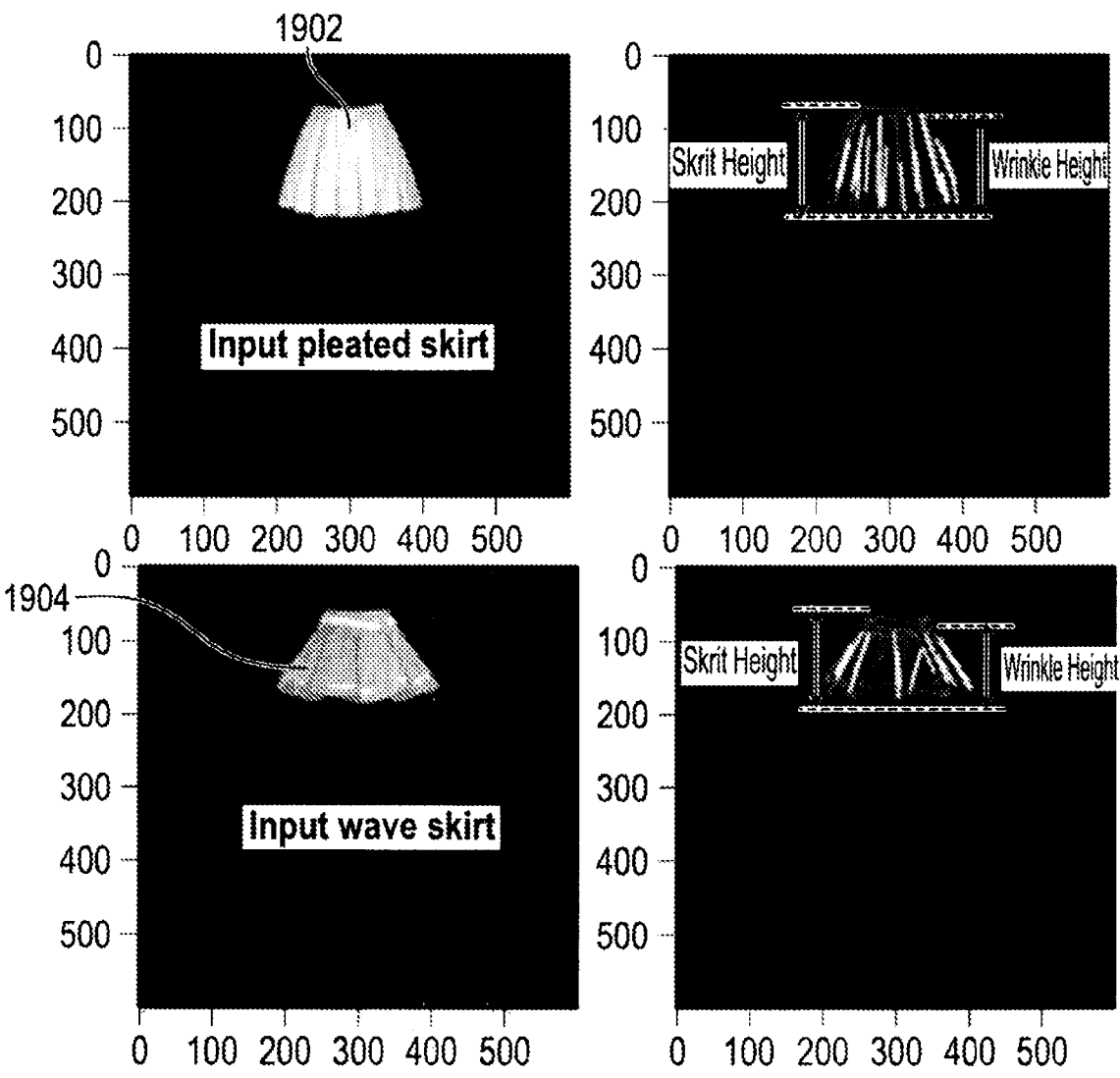
FIG. 19 is an exemplary illustration of an estimation of a skirt wrinkle area.

(4) As shown in FIG. 19, for both a pleated skirt (1902) and a wave skirt (1904), the skirt wrinkle height can be estimated based on a maximum detected wrinkle height. The wrinkle area ratio can be defined as a ratio between the skirt wrinkle height and the skirt height. In an example of the disclosure, an estimation accuracy is 91% across 45 tested ground truth samples.

Figure 20:
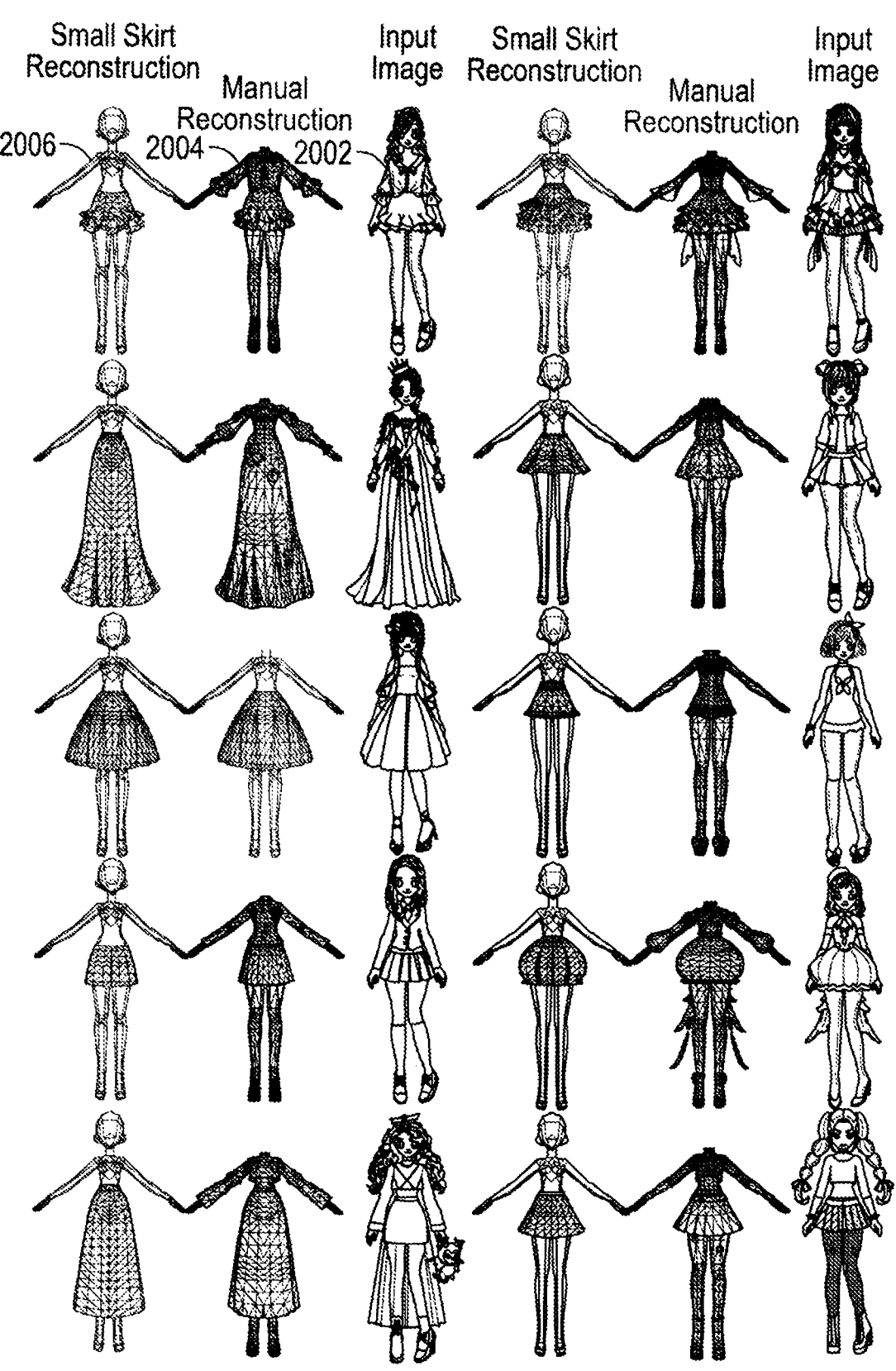
FIG. 20 is an exemplary illustration of reconstructed skirts.

FIG. 20 shows a comparison between an input image (e.g., (2002)), a manually reconstructed skirt (e.g., (2004)), and a SmartSkirt reconstructed skirt (e.g., (2006)). As shown in FIG. 20, SmartSkirt of the disclosure can reconstruct a high-fidelity skirt with a formatted triangulation.

FIG. 21 shows a flow chart outlining an exemplary process (2100) to generate a 3D clothing model (e.g., skirt model) of a piece of clothing (e.g., a skirt) based on 2D images according to some embodiments of the disclosure. The process can be implemented by an information processing apparatus or instructions stored on a computer-readable storage medium, for example. Further, although a skirt is used as an example, it should be noted that the process, apparatus, and computer-readable storage medium can be adapted to generate models of other types of clothing, such as a shirt, a T-shirt, a pair of pants, or the like.

As shown in FIG. 21, the process (2100) can start from (S2101) and proceed to (S2110). At (S2110), a clothing template is determined from a previously constructed clothing model and associated with the piece of clothing. The piece of clothing is included in a plurality of 2D images. The plurality of 2D images corresponds to different sides of the piece of clothing. The clothing template indicates a 3D mesh that includes a plurality of full loops, where each of the plurality of full loops includes a plurality of vertices.

At (S2120), a plurality of side silhouettes of the piece of clothing is determined based on the plurality of 2D images.

At (S2130), a plurality of key point sets is determined based on the plurality of full loops of the clothing template and the plurality of side silhouettes. Each of the plurality of key point sets is determined based on a corresponding one of the plurality of full loops of the clothing template and includes at least one of a center key point or an edge key point.

At (S2140), a plurality of vertices and a plurality of edge loops of the 3D clothing model are determined based on the plurality of key point sets and a plurality of clothing parameters associated with the plurality of 2D images of the piece of clothing. Each of the plurality of edge loops includes (i) a first side and a second side and (ii) one or more vertices of the plurality of vertices.

At (S2150), a plurality of faces of the 3D clothing model is determined based on the plurality of vertices included in the plurality of edge loops.

In some embodiments, the 3D clothing model is generated based on the determined plurality of vertices and the determined plurality of faces. In an example, the 3D clothing model is generated by assembling the determined plurality of vertices and the determined plurality of faces.

In an example, to determine the clothing template, a body silhouette of a body associated with the plurality of 2D images of the piece of clothing is determined. To determine the body silhouette, a 3D model of the body is determined based on one or more of the plurality of 2D images. A plurality of height values associated with a lower portion of the body in the 3D model is determined. Each of the plurality of height values indicates a respective height along the lower portion of the body. A vertex set for each of the plurality of height values is determined. Each of the vertex sets includes a plurality of vertices within a range corresponding to one of the plurality of height values. A plurality of bounding loops of the body silhouette of the body is determined. Each of the plurality of bounding loops includes a respective one of the vertex sets.

In an example, to determine the clothing template, the vertices included in the plurality of full loops are extracted from a foreground layer of the piece of clothing in the plurality of 2D images. The vertices included in the plurality of full loops are sorted from a top side of the plurality of full loops to a bottom side of the plurality of full loops. The plurality of vertices in each of the plurality of full loops are also sorted, such as in a clockwise direction. Faces are generated based on the sorted vertices of the plurality of full loops. The plurality of full loops is extended by adding vertices to the top side and the bottom side of the plurality of full loops. A distance between two respective full loops of the plurality of full loops is adjusted. Vertices and faces of a plurality of half loops are extracted. The plurality of half loops is associated with the body silhouette of the body included in the plurality of 2D images. The clothing template is determined based on (i) the vertices and the faces of the plurality of full loops and (ii) the vertices and the faces of the plurality of half loops.

In some embodiments, to determine the plurality of side silhouettes of the piece of clothing, a left silhouette is determined based on a left boundary of the piece of clothing in a front-view image of the plurality of 2D images. A front silhouette is determined based on a front boundary of the piece of clothing in a side-view image of the plurality of 2D images. A back silhouette is determined based on a back boundary of the piece of clothing in the side-view image of the plurality of 2D images.

In an example, to determine the plurality of key point sets, based on a center of each of the plurality of full loops of the clothing template being included in at least one of the front-view image of the plurality of 2D images or the side-view image of the plurality of 2D images, an uppermost full loop of the plurality of full loops of the clothing template is aligned with a top side of the piece of clothing and a lowermost full loop of the plurality of full loops of the clothing template is aligned with a bottom side of the piece of clothing. A center key point, a left key point, a front key point, and a back key point of each of the plurality of full loops of the clothing template are determined as the key points included in the plurality of key point sets.

In an example, to determine the plurality of vertices, the plurality of edge loops of the 3D clothing model is determined based on the plurality of key point sets. Each of the plurality of edge loops is determined based on a respective one of the plurality of key point sets. Accordingly, a center of each of the plurality of edge loops is a center key point of the respective one of the plurality of key point sets. A diameter in a major axis of each of the plurality of edge loops is a difference between the center key point and the left key point of the respective one of the plurality of key point sets. A first distance in a minor axis of each of the plurality of edge loops is a difference between the center key point and the front key point of the respective one of the plurality of key point sets. A second distance in the minor axis of each of the plurality of edge loops is a difference between the center key point and the back key point of the respective one of the plurality of key point sets.

In an example, to determine the plurality of vertices, based on the plurality of clothing parameters indicating that the piece of clothing is a first skirt type (e.g., a smooth-shaped skirt), $M_s/2$ vertex groups are determined on the first side (e.g., front side) of each of the plurality of edge loops, where each of the $M_s/2$ vertex groups on the first side includes a respective vertex. $M_s/2$ vertex groups are determined on the second side (e.g., back side) of the corresponding one of the plurality of edge loops, where each of the $M_s/2$ vertex groups on the second side includes a respective vertex, $M_s$ being a predefined group number.

In an example, to determine the plurality of vertices, based on the plurality of clothing parameters indicating that the piece of clothing is a second skirt type (e.g., a Z-shaped skirt), $M_z/2$ vertex groups are determined on the first side of each of the plurality of edge loops and $M_z/2$ vertex groups are determined on the second side of the corresponding one of the plurality of edge loops. $M_z$ indicates a predefined number of wrinkles associated with the piece of clothing. Two vertices in each of the $M_z/2$ vertex groups are determined in a first edge loop of the plurality of edge loops, where the two vertices include a vertex in a wrinkle region and another vertex in a non-wrinkle region of the piece of clothing. Three vertices are determined in each of the $M_z/2$ vertex groups in an edge loop other than the first edge loop of the plurality of edge loops, where the three vertices include a first vertex and a second vertex in the wrinkle region and a third vertex in the non-wrinkle region of the piece of clothing.

In an example, to determine the plurality of vertices, based on the plurality of clothing parameters indicating that the piece of clothing is a third skirt type (e.g., a wave-shaped skirt), $M_w/2$ vertex groups are determined on the first side of each of the plurality of edge loops and $M_w/2$ vertex groups are determined on the second side of the corresponding one of the plurality of edge loops, where $M_w$ indicates a predefined number of wrinkles associated with the piece of clothing. Two vertices are determined in each of the $M_w/2$ vertex groups in a first edge loop of the plurality of edge loops. The two vertices include a first vertex in a wrinkle region and a second vertex in a non-wrinkle region of the piece of clothing. Four vertices are determined in each of the $M_w/2$ vertex groups in a second edge loop of the plurality of edge loops in response to a transition between the first edge loop and the second edge loop being less than a transition threshold. The four vertices include three vertices in the wrinkle region and a vertex in the non-wrinkle region of the piece of clothing. Eight vertices are determined in each of the $M_w/2$ vertex groups in the second edge loop of the plurality of edge loops in response to a transition between the first edge loop and the second edge loop being greater than or equal to the transition threshold. The eight vertices include seven vertices in the wrinkle region and the vertex in the non-wrinkle region of the piece of clothing. Eight vertices are determined in each of the $M_w/2$ vertex groups in an edge loop other than the first and second edge loops of the plurality of edge loops, where the eight vertices include seven vertices in the wrinkle region and a vertex in the non-wrinkle region of the piece of clothing.

To determine the plurality of faces of the 3D clothing model, in an example, based on the plurality of clothing parameters indicating that the piece of clothing is a first skirt type, such as a smooth-shaped skirt, the plurality of faces of the 3D clothing model is determined based on the faces associated with the clothing template. In an example, based on the plurality of clothing parameters indicating that the piece of clothing is one of a second skirt type (e.g., a Z-shaped skirt) and a third skirt type (e.g., a wave-shaped skirt), in response to a first edge loop and a second edge loop of the plurality of edge loops having a same number of vertices, (i) a first vertex of the first edge loop and a first vertex of the second edge loop, (ii) a second vertex of the first edge loop and a second vertex of the second edge loop, and (iii) the first vertex of the first edge loop and the second vertex of the second vertex are connected to form two respective faces. In response to the first edge loop and the second edge loop of the plurality of edge loops having a different number of vertices, (i) the first vertex of the first edge loop and the first vertex of the second edge loop, and (ii) the first vertex of the first edge loop and the second vertex of the second edge loop are connected based on a Euclidian distance between the first vertex of the first edge loop and the second vertex of the second edge loop being smaller than a Euclidian distance between the first vertex of the second edge loop and the second vertex of the first edge loop.

In some embodiments, the plurality of clothing parameters indicates at least one of a clothing type, a number of clothing corner points, a clothing wrinkle number, a clothing wrinkle size, a wrinkle type, or a clothing wrinkle area ratio.

In the method, the clothing type of the piece of clothing is determined. To determine the clothing type of the piece of clothing, a neural network is trained based on random clothing parameters, and the clothing type of the piece of clothing is determined based on the neural network.

In an example, to train the neural network, default values of feature parameters associated with a clothing type of a piece of clothing are determined. The feature parameters can include the number of clothing corner points, the clothing wrinkle number, the clothing wrinkle size, the wrinkle type, or the clothing wrinkle area ratio. The clothing type of the piece of clothing includes one of a smooth-shaped skirt, a Z-shaped skirt, and the wave-shaped skirt. Random values of the feature parameters are generated. Each of the random values is within a range of a default value of the default values corresponding to one of the feature parameters. A clothing mesh is reconstructed based on the generated random values of the feature parameters. Random textures are added to the clothing mesh, where the random textures indicate random geometric patterns. A front clothing view, a back clothing view, and a side clothing view of the piece of clothing are rendered based on the reconstructed clothing mesh with the added random textures.

In the method, the number of clothing corner points associated with the piece of clothing is determined. To determine the number of clothing corner points associated with the piece of clothing, one of the plurality of 2D images is binarized into a binary image in which a clothing region in the binary image is set as a foreground region. A convex hull is extracted from the binary image. The convex hull indicates a set of pixels in a convex polygon that surrounds the foreground region in the binary image. Smooth points are filtered out from the convex hull to retain non-smooth points. Each of the non-smooth points includes a curvature equal to or larger than a threshold. (i) a sum of a first coordinate value and a second coordinate value and (ii) a difference between the first coordinate value and the second coordinate value for each of the non-smooth points are determined. An upper right corner point is determined, which corresponds to a maximum value of the sums of the first coordinate values and the second coordinate values. An upper left corner is determined, which corresponds to a minimum value of the sums of the first coordinate values and the second coordinate values. A lower left corner point is determined, which corresponds to a maximum value of the differences between the first coordinate values and the second coordinate values, and a lower right corner point is determined, which corresponds to a minimum value of the differences between the first coordinate values and the second coordinate values.

In the method, the clothing wrinkle number associated with the piece of clothing is determined. To determine the clothing wrinkle number, based on the piece of clothing being a Z-shaped skirt, one of the plurality of 2D images is converted into gray scale. An edge map is extracted from the converted one of the plurality of 2D images. A plurality of straight line segments is determined in the extracted edge map based on a probabilistic Hough transformation. The clothing wrinkle number is determined based on a number of the determined plurality of straight line segments.

In the method, the clothing wrinkle number associated with the piece of clothing is determined. To determine the clothing wrinkle number, based on the piece of clothing being the wave-shaped skirt, one of the plurality of 2D images is binarized into a binary image in which a clothing region in the binary image is set as a foreground region. A clothing bottom curve of the piece of clothing is extracted from the binary image. A plurality of peaks in the clothing bottom curve is determined such that each of the plurality of peaks has a peak prominence greater than a first threshold and a distance of two adjacent peaks of the plurality of peaks is larger than a second threshold. The clothing wrinkle number is determined as a number of the determined plurality of peaks.

In the method, the clothing wrinkle size associated with the piece of clothing is determined. To determine the clothing wrinkle size, based on the piece of clothing being the wave-shaped skirt, one of the plurality of 2D images is binarized into a binary image. A bottom curve of the piece of clothing is extracted from the binary image. A plurality of peaks in the bottom curve is determined such that each of the plurality of peaks has a peak prominence greater than a first threshold, a distance of two adjacent peaks of the plurality of peaks is larger than a second threshold, and each of the plurality of peaks is located in a valid window in which a center part of the piece of clothing is included. A wrinkle width is determined as an average distance of distances between two adjacent peaks of the plurality of peaks and a wrinkle depth is determined as an average prominence of prominences of the plurality of peaks.

In the method, the wrinkle type is determined based on the piece of clothing being the wave-shaped skirt. To determine the wrinkle type, one of the plurality of 2D images is binarized into a binary image. A bottom curve of the piece of clothing is determined based on the binary image. Whether the wrinkle type is a double-Z type or a single-V type is determined based on a gradient of the bottom curve.

In the method, the clothing wrinkle area ratio associated with the piece of clothing is determined. To determine the clothing wrinkle area ratio, based on the piece of clothing being one of a Z-shaped skirt and the wave-shaped skirt, one of the plurality of 2D images is converted into gray scale. An edge map is extracted from the converted one of the plurality of 2D images. A plurality of straight line segments that corresponds to wrinkles of the piece of clothing is determined from the extracted edge map. The clothing wrinkle area ratio is determined based on a ratio between a maximum wrinkle height of the wrinkles and a height of the piece of clothing.

The techniques described above, can be implemented as computer software using computer-readable instructions and physically stored in one or more computer-readable media. For example, FIG. 22 shows a computer system (2200) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 22:
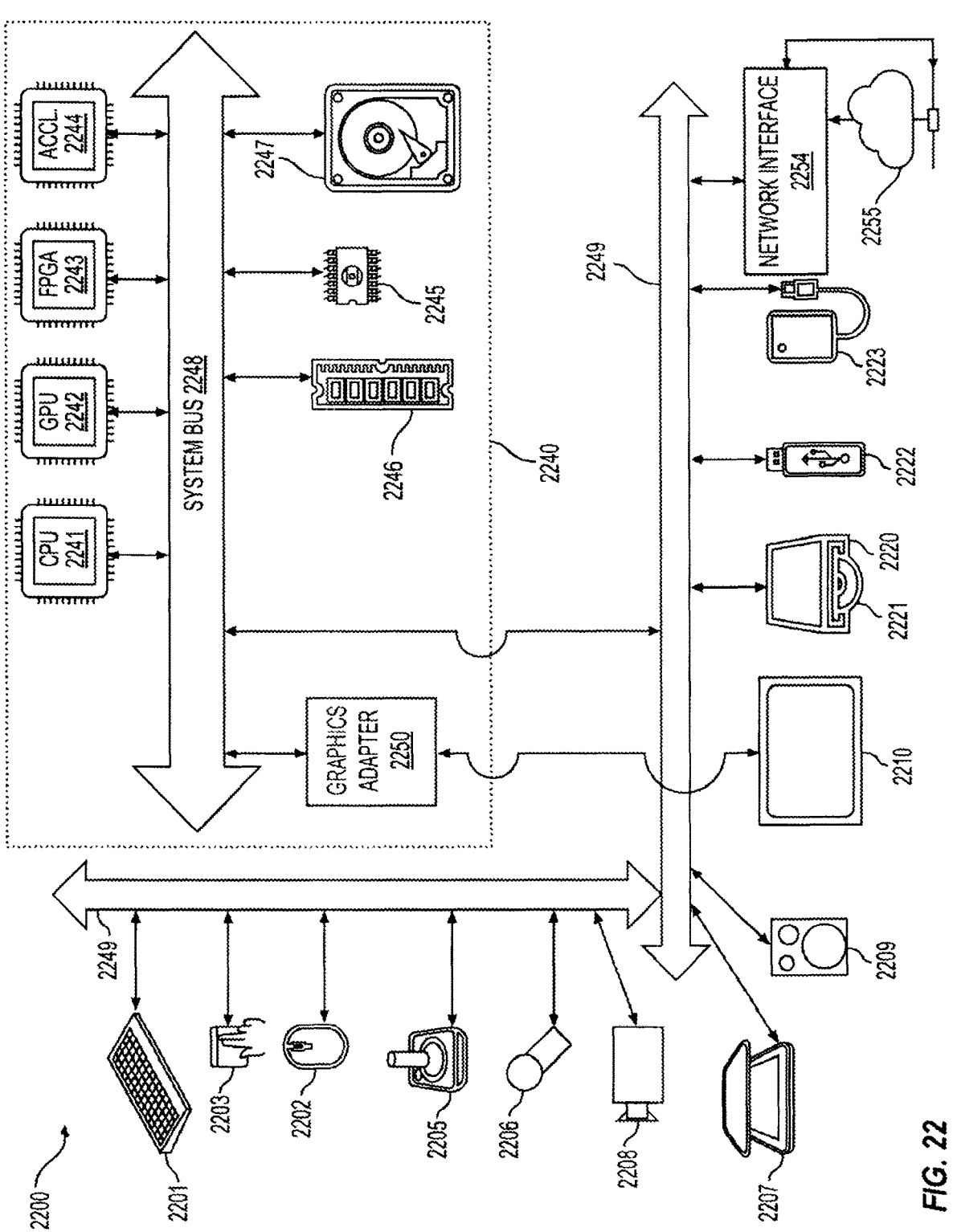
FIG. 22 is a schematic illustration of a computer system in accordance with an embodiment.

The components shown in FIG. 22 for computer system (2200) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2200).

Computer system (2200) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2201), mouse (2202), trackpad (2203), touch screen (2210), data-glove (not shown), joystick (2205), microphone (2206), scanner (2207), camera (2208).

Computer system (2200) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2210), data-glove (not shown), or joystick (2205), but there can also be tactile feedback devices that do not serve as input devices), audio output devices (such as: speakers (2209), headphones (not depicted)), visual output devices (such as screens (2210) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (2200) can also include human accessible storage devices and their associated media such as optical media including CD/DVD ROM/RW (2220) with CD/DVD or the like media (2221), thumb-drive (2222), removable hard drive or solid state drive (2223), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2200) can also include an interface (2254) to one or more communication networks (2255). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2249) (such as, for example USB ports of the computer system (2200)); others are commonly integrated into the core of the computer system (2200) by attachment to a system bus as described below (for example Ethernet interface into a PC computer system or cellular network interface into a smartphone computer system). Using any of these networks, computer system (2200) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2240) of the computer system (2200).

The core (2240) can include one or more Central Processing Units (CPU) (2241), Graphics Processing Units (GPU) (2242), specialized programmable processing units in the form of Field Programmable Gate Areas (FPGA) (2243), hardware accelerators for certain tasks (2244), graphics adapters (2250), and so forth. These devices, along with Read-only memory (ROM) (2245), Random-access memory (2246), internal mass storage such as internal non-user accessible hard drives, SSDs, and the like (2247), may be connected through a system bus (2248). In some computer systems, the system bus (2248) can be accessible in the form of one or more physical plugs to enable extensions by additional CPUs, GPU, and the like. The peripheral devices can be attached either directly to the core's system bus (2248), or through a peripheral bus (2249). In an example, the screen (2210) can be connected to the graphics adapter (2250). Architectures for a peripheral bus include PCI, USB, and the like.

CPUs (2241), GPUs (2242), FPGAs (2243), and accelerators (2244) can execute certain instructions that, in combination, can make up the aforementioned computer code. That computer code can be stored in ROM (2245) or RAM (2246). Transitional data can also be stored in RAM (2246), whereas permanent data can be stored for example, in the internal mass storage (2247). Fast storage and retrieve to any of the memory devices can be enabled through the use of cache memory, that can be closely associated with one or more CPU (2241), GPU (2242), mass storage (2247), ROM (2245), RAM (2246), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system (2200) having architecture, and specifically the core (2240) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2240) that are of non-transitory nature, such as core-internal mass storage (2247) or ROM (2245). The software implementing various embodiments of the present disclosure can be stored in such devices and executed by core (2240). A computer-readable medium can include one or more memory devices or chips, according to particular needs. The software can cause the core (2240) and specifically the processors therein (including CPU, GPU, FPGA, and the like) to execute particular processes or particular parts of particular processes described herein, including defining data structures stored in RAM (2246) and modifying such data structures according to the processes defined by the software. In addition or as an alternative, the computer system can provide functionality as a result of logic hardwired or otherwise embodied in a circuit (for example: accelerator (2244)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of generating a three-dimensional (3D ) clothing model of a piece of clothing, the method comprising:

determining a clothing template from a previously constructed clothing model that is associated with the piece of clothing associated with a body, the piece of clothing being included in a plurality of 2D images, the plurality of 2D images corresponding to different sides of the piece of clothing, the clothing template indicating a 3D mesh that includes a plurality of full loops, each of the plurality of full loops including a plurality of vertices, the clothing template being determined based on (i) the vertices and faces of the plurality of full loops and (ii) vertices and faces extracted from a plurality of half loops, the vertices of the plurality of full loops being extracted from a foreground layer of the piece of clothing in the plurality of 2D images, the faces of the plurality of full loops being generated based on sorted foreground vertices, the plurality of half loops being associated with a body silhouette of the body included in the plurality of 2D images;

determining a plurality of side silhouettes of the piece of clothing based on the plurality of 2D images, a lateral side silhouette of the plurality of side silhouettes being determined based on a lateral side boundary of the piece of clothing in a front-view image of the plurality of 2D images;

determining a plurality of key point sets based on the vertices of the plurality of full loops of the clothing template and the plurality of side silhouettes, each of the plurality of key point sets being determined based on a corresponding one of the plurality of full loops of the clothing template and including at least one of a center key point or an edge key point;

determining a plurality of vertices and a plurality of edge loops of the 3D clothing model based on the plurality of key point sets and a plurality of clothing parameters associated with the plurality of 2D images of the piece of clothing, each of the plurality of edge loops including (i) a first side and a second side and (ii) one or more vertices of the plurality of vertices of the 3D clothing model; and determining a plurality of faces of the 3D clothing model based on the vertices included in the plurality of edge loops.

2. The method of claim 1, further comprising:

generating the 3D clothing model based on the determined plurality of vertices of the 3D clothing model and the determined plurality of faces.

3. The method of claim 1, wherein:

the determining the clothing template includes determining the body silhouette of the body associated with the plurality of 2D images of the piece of clothing; and the determining the body silhouette further comprises:

determining a 3D model of the body based on one or more of the plurality of 2D images;

determining a plurality of height values associated with a lower portion of the body in the 3D model, each of the plurality of height values indicating a respective height along the lower portion of the body, determining a vertex set for each of the plurality of height values, each of the vertex sets including a plurality of vertices within a range corresponding to one of the plurality of height values, and determining a plurality of bounding loops of the body silhouette of the body, each of the plurality of bounding loops including a respective one of the vertex sets.

4. The method of claim 3, wherein the determining the clothing template further comprises:

extracting the vertices included in the plurality of full loops from the foreground layer of the piece of clothing in the plurality of 2D images;

sorting the vertices included in the plurality of full loops from a top side of the plurality of full loops to a bottom side of the plurality of full loops, and the plurality of vertices in each of the plurality of full loops;

generating the faces of the plurality of full loops based on the sorted vertices of the plurality of full loops;

extending the plurality of full loops by adding vertices to the top side and the bottom side of the plurality of full loops;

adjusting a distance between two respective full loops of the plurality of full loops; and extracting the vertices and the faces of the plurality of half loops associated with the body silhouette of the body included in the plurality of 2D images.

5. The method of claim 4, wherein the determining the plurality of side silhouettes of the piece of clothing further comprises:

determining a left silhouette based on a left boundary of the piece of clothing in a front-view image of the plurality of 2D images;

determining a front silhouette based on a front boundary of the piece of clothing in a side-view image of the plurality of 2D images; and determining a back silhouette based on a back boundary of the piece of clothing in the side-view image of the plurality of 2D images.

6. The method of claim 5, wherein the determining the plurality of key point sets further comprises:

based on a center of each of the plurality of full loops of the clothing template being included in at least one of the front-view image of the plurality of 2D images or the side-view image of the plurality of 2D images, aligning an uppermost full loop of the plurality of full loops of the clothing template with a top side of the piece of clothing and a lowermost full loop of the plurality of full loops of the clothing template with a bottom side of the piece of clothing; and determining a center key point, a left key point, a front key point, and a back key point of each of the plurality of full loops of the clothing template as the key points included in the plurality of key point sets.

7. The method of claim 6, wherein the determining the plurality of vertices further comprises:

determining the plurality of edge loops of the 3D clothing model based on the plurality of key point sets, each of the plurality of edge loops being determined based on a respective one of the plurality of key point sets, wherein:

a center of each of the plurality of edge loops is a center key point of the respective one of the plurality of key point sets, a diameter in a major axis of each of the plurality of edge loops is a difference between the center key point and the left key point of the respective one of the plurality of key point sets, a first distance in a minor axis of each of the plurality of edge loops is a difference between the center key point and the front key point of the respective one of the plurality of key point sets, and a second distance in the minor axis of each of the plurality of edge loops is a difference between the center key point and the back key point of the respective one of the plurality of key point sets.

8. The method of claim 7, wherein the determining the plurality of vertices further comprises:

based on the plurality of clothing parameters indicating that the piece of clothing is a first skirt type, determining $M_s/2$ vertex groups on the first side of each of the plurality of edge loops, each of the $M_s/2$ vertex groups on the first side including a respective vertex; and determining $M_s/2$ vertex groups on the second side of the corresponding one of the plurality of edge loops, each of the $M_s/2$ vertex groups on the second side including a respective vertex, $M_s$ being a predefined group number.

9. The method of claim 7, wherein the determining the plurality of vertices further comprises:

based on the plurality of clothing parameters indicating that the piece of clothing is a second skirt type, determining $M_z/2$ vertex groups on the first side of each of the plurality of edge loops and $M_z/2$ vertex groups on the second side of the corresponding one of the plurality of edge loops, $M_z$ indicating a predefined number of wrinkles associated with the piece of clothing;

determining two vertices in each of the $M_z/2$ vertex groups in a first edge loop of the plurality of edge loops, the two vertices including a vertex in a wrinkle region and another vertex in a non-wrinkle region of the piece of clothing; and determining three vertices in each of the $M_z/2$ vertex groups in an edge loop other than the first edge loop of the plurality of edge loops, the three vertices including a first vertex and a second vertex in the wrinkle region and a third vertex in the non-wrinkle region of the piece of clothing.

10. The method of claim 7, wherein the determining the plurality of vertices further comprises:

based on the plurality of clothing parameters indicating that the piece of clothing is a third skirt type, determining $M_w/2$ vertex groups on the first side of each of the plurality of edge loops and $M_w/2$ vertex groups on the second side of the corresponding one of the plurality of edge loops, $M_w$ indicating a predefined number of wrinkles associated with the piece of clothing;

determining two vertices in each of the $M_w/2$ vertex groups in a first edge loop of the plurality of edge loops, the two vertices including a first vertex in a wrinkle region and a second vertex in a non-wrinkle region of the piece of clothing;

determining four vertices in each of the $M_w/2$ vertex groups in a second edge loop of the plurality of edge loops in response to a transition between the first edge loop and the second edge loop being less than a transition threshold, the four vertices including three vertices in the wrinkle region and a vertex in the non-wrinkle region of the piece of clothing;

determining eight vertices in each of the $M_w/2$ vertex groups in the second edge loop of the plurality of edge loops in response to a transition between the first edge loop and the second edge loop being greater than or equal to the transition threshold, the eight vertices including seven vertices in the wrinkle region and the vertex in the non-wrinkle region of the piece of clothing; and determining eight vertices in each of the $M_w/2$ vertex groups in an edge loop other than the first and second edge loops of the plurality of edge loops, the eight vertices including seven vertices in the wrinkle region and a vertex in the non-wrinkle region of the piece of clothing.

11. The method of claim 4, wherein the determining the plurality of faces of the 3D clothing model further comprises:

based on the plurality of clothing parameters indicating that the piece of clothing is a first skirt type, determining the plurality of faces of the 3D clothing model based on the faces associated with the clothing template; and based on the plurality of clothing parameters indicating that the piece of clothing is one of a second skirt type and a third skirt type, in response to a first edge loop and a second edge loop of the plurality of edge loops having a same number of vertices, connecting (i) a first vertex of the first edge loop and a first vertex of the second edge loop, (ii) a second vertex of the first edge loop and a second vertex of the second edge loop, and (iii) the first vertex of the first edge loop and the second vertex of the second vertex to form two respective faces, and in response to the first edge loop and the second edge loop of the plurality of edge loops having a different number of vertices, connecting (i) the first vertex of the first edge loop and the first vertex of the second edge loop, and (ii) the first vertex of the first edge loop and the second vertex of the second edge loop based on a Euclidian distance between the first vertex of the first edge loop and the second vertex of the second edge loop being smaller than a Euclidian distance between the first vertex of the second edge loop and the second vertex of the first edge loop.

12. The method of claim 1, wherein the plurality of clothing parameters indicates at least one of a clothing type, a number of clothing corner points, a clothing wrinkle number, a clothing wrinkle size, a wrinkle type, or a clothing wrinkle area ratio.

13. The method of claim 12, further comprising:
determining the clothing type of the piece of clothing; and
the determining the clothing type of the piece of clothing further comprises:
training a neural network based on random clothing parameters, and
determining the clothing type of the piece of clothing based on the neural network.

14. The method of claim 13, wherein the training the neural network further comprises:
determining default values of feature parameters associated with a clothing type of a piece of clothing, the clothing type of the piece of clothing including one of a smooth-shaped skirt, a Z-shaped skirt, and a wave-shaped skirt;

generating random values of the feature parameters, each of the random values being within a range of a default value of the default values corresponding to one of the feature parameters;
reconstructing a clothing mesh based on the generated random values of the feature parameters;
adding random textures to the clothing mesh, the random textures indicating random geometric patterns; and
rendering a front clothing view, a back clothing view, and a side clothing view of the piece of clothing based on the reconstructed clothing mesh with the added random textures.

15. The method of claim 12, further comprising:
determining the number of clothing corner points associated with the piece of clothing; and
the determining the number of clothing corner points associated with the piece of clothing further comprises:
binarizing one of the plurality of 2D images into a binary image in which a clothing region in the binary image is set as a foreground region,
extracting a convex hull from the binary image, the convex hull indicating a set of pixels in a convex polygon that surrounds the foreground region in the binary image,
filtering out smooth points from the convex hull to retain non-smooth points, each of the non-smooth points including a curvature equal to or larger than a threshold,
determining (i) a sum of a first coordinate value and a second coordinate value and (ii) a difference between the first coordinate value and the second coordinate value for each of the non-smooth points, and
determining an upper right corner point that corresponds to a maximum value of the sums of the first coordinate values and the second coordinate values, an upper left corner that corresponds to a minimum value of the sums of the first coordinate values and the second coordinate values, a lower left corner point that corresponds to a maximum value of the differences between the first coordinate values and the second coordinate values, and a lower right corner point that corresponds to a minimum value of the differences between the first coordinate values and the second coordinate values.

16. The method of claim 12, further comprising:
determining the clothing wrinkle number associated with the piece of clothing; and
the determining the clothing wrinkle number further comprises:
based on the piece of clothing being a Z-shaped skirt, converting one of the plurality of 2D images into gray scale,
extracting an edge map from the converted one of the plurality of 2D images,
determining a plurality of straight line segments in the extracted edge map based on a probabilistic Hough transformation, and
determining the clothing wrinkle number based on a number of the determined plurality of straight line segments.

17. The method of claim 12, further comprising:
determining the clothing wrinkle number associated with the piece of clothing; and
the determining the clothing wrinkle number further comprises:
based on the piece of clothing being a wave-shaped skirt, binarizing one of the plurality of 2D images into a binary image in which a clothing region in the binary image is set as a foreground region, extracting a clothing bottom curve of the piece of clothing from the binary image, determining a plurality of peaks in the clothing bottom curve such that each of the plurality of peaks has a peak prominence greater than a first threshold and a distance of two adjacent peaks of the plurality of peaks is larger than a second threshold, and determining the clothing wrinkle number as a number of the determined plurality of peaks.

18. The method of claim 12, further comprising:

determining the clothing wrinkle size associated with the piece of clothing; and the determining the clothing wrinkle size further comprises:

based on the piece of clothing being a wave-shaped skirt, binarizing one of the plurality of 2D images into a binary image, extracting a bottom curve of the piece of clothing from the binary image, determining a plurality of peaks in the bottom curve such that each of the plurality of peaks has a peak prominence greater than a first threshold, a distance of two adjacent peaks of the plurality of peaks is larger than a second threshold, and each of the plurality of peaks is located in a valid window in which a center part of the piece of clothing is included, and determining a wrinkle width as an average distance of distances between two adjacent peaks of the plurality of peaks and a wrinkle depth as an average prominence of prominences of the plurality of peaks.

19. The method of claim 12, further comprising:

determining the wrinkle type of the piece of clothing based on the piece of clothing being a wave-shaped skirt; and the determining the wrinkle type further comprises:

binarizing one of the plurality of 2D images into a binary image, determining a bottom curve of the piece of clothing based on the binary image, and determining whether the wrinkle type is a double-Z type or a single-V type based on a gradient of the bottom curve.

20. The method of claim 12, further comprising:

determining the clothing wrinkle area ratio associated with the piece of clothing; and the determining the clothing wrinkle area ratio further comprises:

based on the piece of clothing being one of a Z-shaped skirt and a wave-shaped skirt, converting one of the plurality of 2D images into gray scale, extracting an edge map from the converted one of the plurality of 2D images, determining a plurality of straight line segments that corresponds to wrinkles of the piece of clothing from the extracted edge map, and determining the clothing wrinkle area ratio based on a ratio between a maximum wrinkle height of the wrinkles and a height of the piece of clothing.

\* \* \* \* \*